United States Patent
Chae et al.

(10) Patent No.: US 10,349,359 B2
(45) Date of Patent: Jul. 9, 2019

(54) DEVICE AND METHOD FOR CONTROLLING TRANSMISSION POWER IN WIRELESS COMMUNICATION SYSTEM

(71) Applicant: Samsung Electronics Co., Ltd., Suwon-si, Gyeonggi-do (KR)

(72) Inventors: Sungho Chae, Seoul (KR); Cheol Jeong, Seongnam-si (KR); Hyunseok Ryu, Yongin-si (KR); Peng Xue, Suwon-si (KR); Namjeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/746,354

(22) PCT Filed: Jul. 20, 2016

(86) PCT No.: PCT/KR2016/007868
§ 371 (c)(1),
(2) Date: Jan. 19, 2018

(87) PCT Pub. No.: WO2017/014540
PCT Pub. Date: Jan. 26, 2017

(65) Prior Publication Data
US 2018/0213487 A1    Jul. 26, 2018

(30) Foreign Application Priority Data
Jul. 20, 2015 (KR) .................. 10-2015-0102512

(51) Int. Cl.
*H04W 52/24* (2009.01)
*H04W 52/14* (2009.01)

(52) U.S. Cl.
CPC ....... *H04W 52/243* (2013.01); *H04W 52/146* (2013.01); *H04W 52/242* (2013.01); *H04W 52/244* (2013.01); *H04W 52/246* (2013.01)

(58) Field of Classification Search
None
See application file for complete search history.

(56) References Cited

U.S. PATENT DOCUMENTS

| 2010/0177722 A1 | 7/2010 | Guvenc |
| 2012/0052904 A1 | 3/2012 | Gao et al. |

(Continued)

FOREIGN PATENT DOCUMENTS

| KR | 10-2013-0104500 A | 9/2013 |
| KR | 10-2015-0128520 A | 11/2015 |

(Continued)

OTHER PUBLICATIONS

ISA/KR, International Search Report and Written Opinion of the International Searching Authority, International Application No. PCT/KR2016/007868, dated Oct. 20, 2016, 9 pages.

(Continued)

*Primary Examiner* — Mohammed Rachedine

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various exemplary embodiments, a terminal may include a controller for deciding whether interference to a second base station occurs due to a signal to be transmitted to a first base station and for determining transmission power in response to the decision, and a transceiver for transmitting a signal to the first base station based on the determined transmission power.

20 Claims, 21 Drawing Sheets

(56) References Cited

U.S. PATENT DOCUMENTS

| | | |
|---|---|---|
| 2013/0040690 A1 | 2/2013 | Lee |
| 2013/0217429 A1* | 8/2013 | Kimura ................ H04W 16/14 |
| | | 455/509 |
| 2014/0302866 A1* | 10/2014 | Lee .................... H04W 52/146 |
| | | 455/452.1 |
| 2015/0072690 A1 | 3/2015 | Kim et al. |
| 2015/0223181 A1* | 8/2015 | Noh ..................... H04L 5/0048 |
| | | 370/329 |

FOREIGN PATENT DOCUMENTS

| | | |
|---|---|---|
| KR | 10-2016-0065700 A | 6/2016 |
| WO | 2011136567 A2 | 11/2011 |
| WO | 2014039849 A1 | 3/2014 |
| WO | 2015170937 A1 | 11/2015 |

OTHER PUBLICATIONS

3GPP TR 36.8888 V12.0.0 (Jun. 2013), Technical Report, 3rd Generation Partnership Project; Technical Specification 3roup Radio Access Network; Study on provision of low-cost Machine-Type Communications (MTC) User Equipments (UEs) based on LTE (Release 12), 55 pages.

Vartiainen, Johanna, et al, "Spectrum Sensing With LAD-Based Methods," the 18th Annual IEEE International Symposium on Personal, Indoor and Mobile Radio Communications (PIMRC'07), IEEE, 2007, 5 pages.

* cited by examiner

DEVICE AND METHOD FOR CONTROLLING TRANSMISSION POWER IN WIRELESS COMMUNICATION SYSTEM

CROSS-REFERENCE TO RELATED APPLICATIONS AND CLAIM OF PRIORITY

The present application claims priority under 35 U.S.C. § 365 and is a 371 National Stage of International Application No. PCT/KR2016/007868, filed Jul. 20, 2016, which claims the benefit of Korean Patent Application No. 10-2015-0102512, filed Jul. 20, 2015, the disclosures of which are fully incorporated herein by reference into the present disclosure as if fully set forth herein.

TECHNICAL FIELD

Exemplary embodiments described below relate to a transmission power control in a network environment in which different communication systems coexist.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With the development of communication technologies, not only a cellular communication service but also various communication services such as Internet of Things (IoT) or the like are required. In addition, a case where different communication systems coexist occurs more frequently due to the requirement of the various communication services.

SUMMARY

Accordingly, various exemplary embodiments of the present invention provide an apparatus and method for controlling transmission power of a terminal in a network environment in which different communication systems coexist.

Various exemplary embodiments of the present invention provide an apparatus and method for controlling transmission power of a signal to be transmitted to a serving base station so that interference to a neighboring base station does not occur in a network environment in which different communication systems coexist.

According to various exemplary embodiments, a terminal may include a controller for deciding whether interference to a second base station occurs due to a signal to be transmitted to a first base station and for determining transmission power in response to the decision, and a transceiver for transmitting a signal to the first base station based on the determined transmission power.

According to various exemplary embodiments, a method of operating a terminal may include deciding whether interference to a second base station occurs due to a signal to be transmitted to a first base station, determining transmission power in response to the decision, and transmitting a signal to the first base station based on the determined transmission power.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The present invention will be more apparent from the following detailed description taken in conjunction with the accompanying drawings, wherein like reference numerals denote like components throughout the drawings, and in which.

DETAILED DESCRIPTION

Figure 1:
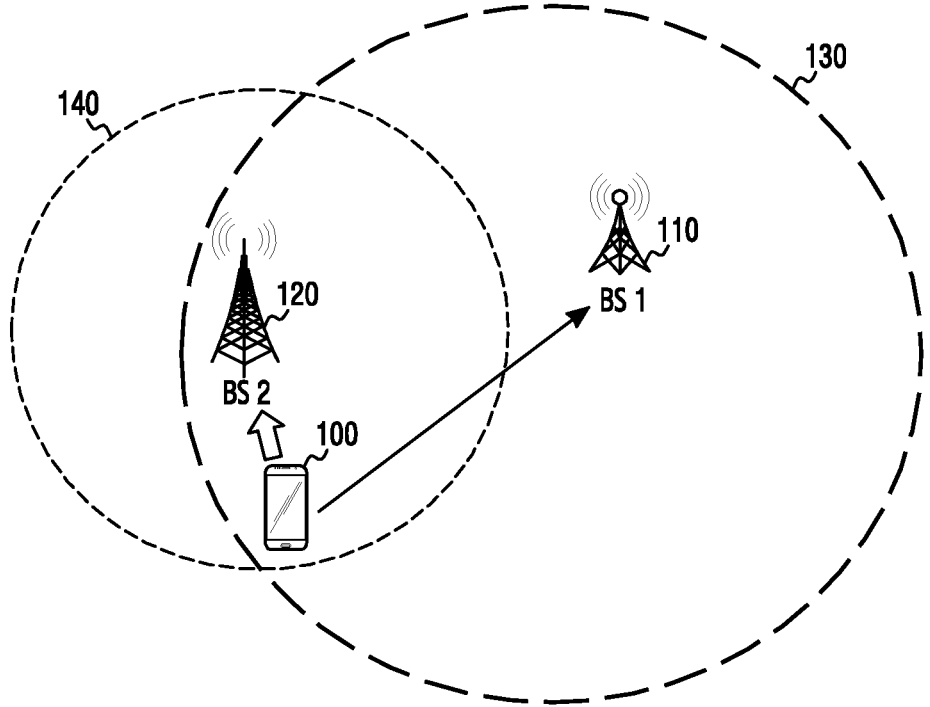
FIG. 1 illustrates a network environment in which two different communication systems coexist according to the present invention.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various exemplary embodiments of the present document are described with reference to the accompanying drawings. It should be understood, however, that it is not intended to limit the exemplary embodiments of the present document to the particular form disclosed, but, on the contrary, it is intended to cover all modifications, equivalents, and alternatives falling within the spirit and scope of the exemplary embodiments of the present document. Like reference numerals denote like constitutional elements throughout the drawings.

Terms used in the present document are for the purpose of describing particular embodiments only and are not intended to limit other exemplary embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the present document. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the exemplary embodiments of the present document.

A hardware-based access method is described for example in the various exemplary embodiments of the present invention described hereinafter. However, since the various exemplary embodiments of the present invention include a technique in which hardware and software are both used, a software-based access method is not excluded in the exemplary embodiments of the present invention.

FIG. 1 illustrates a network environment in which two different communication systems coexist according to the present invention.

Referring to FIG. 1, the network environment may include a terminal 100, a first Base Station (BS1) 110, and a second BS (BS2) 120.

The BS 110 and the BS 120 may be BSs for providing different services. The BS 110 and the BS 120 may have different coverage regions according to the provided services. The BS 110 and the BS 120 may perform communication by utilizing resources adjacent to each other due to limited resources.

Although two BSs are described hereinafter for example according to various exemplary embodiments of the present invention, the various exemplary embodiments of the present invention may also be used when a plurality of BSs coexist.

The terminal 100 may be a terminal for receiving a service from the BS 110. The terminal 100 may be located in a coverage 130 of the BS 110 and a coverage 140 of the BS 120. The terminal 100 may transmit a signal to the BS 110.

For example, the terminal 100 may attempt random access to acquire uplink synchronization, or may transmit data. If the terminal 100 is located in the coverage 140, a signal transmitted by the terminal 100 to the BS 110 may act as interference to the BS 120. The interference may cause deterioration in performance of the BS 120 by affecting hardware of the BS 120. The terminal 100 according to the various exemplary embodiments of the present invention may control transmission power of a signal to be transmitted from the terminal 100 so that interference to the BS 120 does not occur while smoothly communicating with the BS 110.

Figure 2:
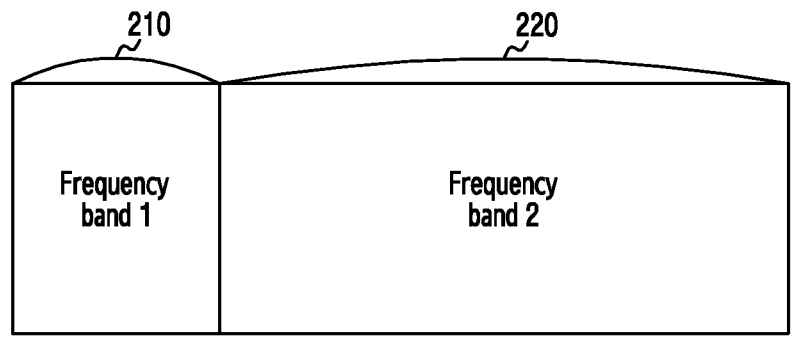
FIG. 2 illustrates a frequency band used by two different communication systems according to the present invention.

FIG. 2 illustrates a frequency band used by two different communication systems according to the present invention.

Referring to FIG. 2, the BS 110 may use a first frequency band 210 to communicate with terminals in the coverage of the BS 110, and may use a second frequency band 220 to communicate with terminals in the coverage of the BS 120.

The BS 110 and the BS 120 may provide different communication services. For example, the BS 110 may be a BS for providing an Internet of Things (IoT) service, and the BS 120 may be a BS for providing a Long Term Evolution (LTE) service. In addition, the frequency band 210 used by the BS 110 and the frequency band 220 used by the BS 120 may be adjacent to each other. For example, the frequency band 220 may be an LTE band, and the frequency band 210 may be a guard band of the LTE band and may be used for the IoT service.

For another example, the frequency band 210 may be the LTE band, and the frequency band 220 may be the guard band of the LTE band and may be used for the IoT service.

If the terminal 100 transmits a signal to the BS 110, since the signal is transmitted through the frequency band 210 adjacent to the frequency band 220, interference to the BS 120 may occur. If the BS 110 and the BS 120 use adjacent frequency bands, the terminal 100 according to the various exemplary embodiments of the present invention may control transmission power of a signal to be transmitted from the terminal 100 so that interference to the BS 120 does not occur, while smoothly communicating with the BS 110.

Figure 3:
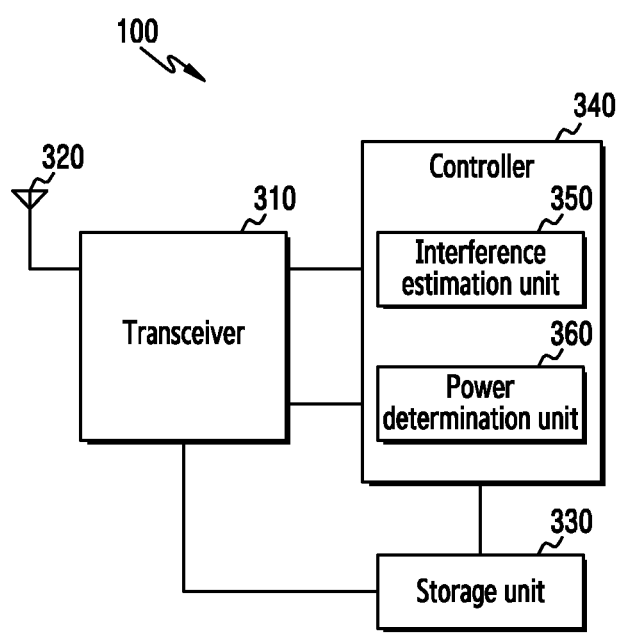
FIG. 3 illustrates a structure of a terminal according to various exemplary embodiments of the present invention.

FIG. 3 illustrates a structure of a terminal according to various exemplary embodiments of the present invention. For example, the terminal may be the terminal 100 of FIG. 1.

Referring to FIG. 3, the terminal 100 may include a transceiver 310, an antenna 320, a storage unit 330, and a controller 340.

The transceiver 310 may include a Radio Frequency Transmitter (RF TX) which up-converts a transmitted signal into an RF signal and then performs power amplification thereon. The transceiver 310 may include a Radio Frequency Receiver (RF RX) which amplifies a received RF signal with a low noise and thereafter down-converts it to a baseband signal.

In addition, the transceiver 310 may further include a modulator. The modulator may be a modulator of an orthogonal (e.g., Orthogonal Frequency Division Multiplexing (OFDM)) type or a non-orthogonal (e.g., Filter Bank Multi-Carrier (FBMC)) type. The transceiver 310 may further include a de-modulator. The de-modulator may be a demodulator of the orthogonal type or the non-orthogonal type.

The antenna 320 may receive a signal from a BS (e.g., the BS 110 or the BS 120). For example, the antenna 320 may receive a pilot signal, a reference signal, or the like from the BS 110 or 120. In addition, the antenna 320 may transmit a signal to the BS 110. For example, the antenna 320 may transmit a signal including a random access resource and a signal including data to the BS 110.

The storage unit 330 may be a group of one or more memories. The storage unit 330 may store data and/or instructions received from different constitutional elements (e.g., the transceiver 310, the controller 340, etc.) or generated by the different constitutional elements. The storage unit 330 may store power control information or the like received from the BS 110 or 120. In addition, the antenna 320 may include information regarding the terminal 100, BS 110, and BS 120. For example, the storage unit 330 may include transmission power of the BS 110, a typical communication environment of the terminal 100, path loss information in an environment in which the terminal 100 is frequently located, typical transmission power of the BS, or the like.

The controller 340 may be implemented with a System on Chip (SoC). In addition, the controller 340 may be optionally divided to be implemented by being combined with an internal constitutional element (e.g., the transceiver 310, the storage unit 330) of the terminal 100.

The controller 340 may receive an instruction of the different constitutional elements (e.g., the transceiver 310, the storage unit 330), interpret the received instruction, and perform calculation or data processing according to the interpreted instruction.

The controller 340 may include an interference estimation unit 350 and a power determination unit 360. Further, the controller 340 may include at least one processor or microprocessor, or may play the part of the processor.

The interference estimation unit 350 may estimate whether a signal to be transmitted by the terminal 100 may cause interference to a neighboring BS (e.g., the BS 120). For example, if the terminal 100 is located in the coverage of the BS 110 and BS 120 which provide different services as shown in FIG. 1, the interference estimation unit 350 may control the terminal 100 so that the signal to be transmitted to the BS 110 does not cause interference to the BS 120.

The interference estimation unit 350 may estimate whether the signal to be transmitted by the terminal 100 may cause interference based on information of a BS (e.g., the BS 120 of FIG. 1, for convenience, referred to as the BS 120) which does not provide a service to the terminal 100 but is located in proximity to the terminal 100. In one exemplary embodiment, the information may be acquired by a method of decoding a DownLink (DL) signal from the BS 120. In another exemplary embodiment, the information may be acquired by a method of measuring reception strength of the DL signal. In another exemplary embodiment, the information may be acquired by a method of measuring a distance between the BS and the terminal. In another exemplary embodiment, the information may be acquired by a calculation method based on a predefined criterion. In another exemplary embodiment, the information may be acquired by a method of decoding a reference signal. The information may be described below in greater detail in each exemplary embodiment.

The interference estimation unit 350 may calculate a path loss between the BS 120 and the terminal 100 based on the information of the BS 120. The interference estimation unit 350 may determine threshold transmission power which does not cause interference based on the calculated path loss. If predefined transmission power is greater than the threshold transmission power, the interference estimation unit 350 may decide that the interference may occur. Otherwise, if the predefined transmission power is less than or equal to the threshold transmission power, the interference estimation unit 350 may decide the interference does not occur.

The power determination unit 360 may determine transmission power of the terminal 100 in response to a decision result of the interference estimation unit 350. Specifically, if the interference estimation unit 350 decides that the information to the BS 120 may occur, the power determination unit 360 may determine the transmission power by downwardly adjusting the predefined transmission power. In one exemplary embodiment, the transmission power may be determined as a value less than or equal to the threshold transmission power calculated by the interference estimation unit 350. If the transmission power is decreased as described above, a probability that a signal transmitted by the terminal 100 reaches a serving BS (hereinafter, for convenience, referred to as the BS 110) may be decreased. Therefore, to compensate for this, the power determination unit 360 may increase the number of times of performing transmission in response to a transmission power value. The terminal 100 may reliably transmit a signal to the BS 110 due to the increase in the number of times of performing transmission. That is, the terminal 100 may reliably transmit the signal to the BS 110 without causing interference to the BS 120.

Although it is illustrated in FIG. 3 that the controller 340 includes only the interference estimation unit 350 and the power determination unit 360, the controller 340 may further include other constitutional elements as described below according to a certain exemplary embodiment.

Figure 4:
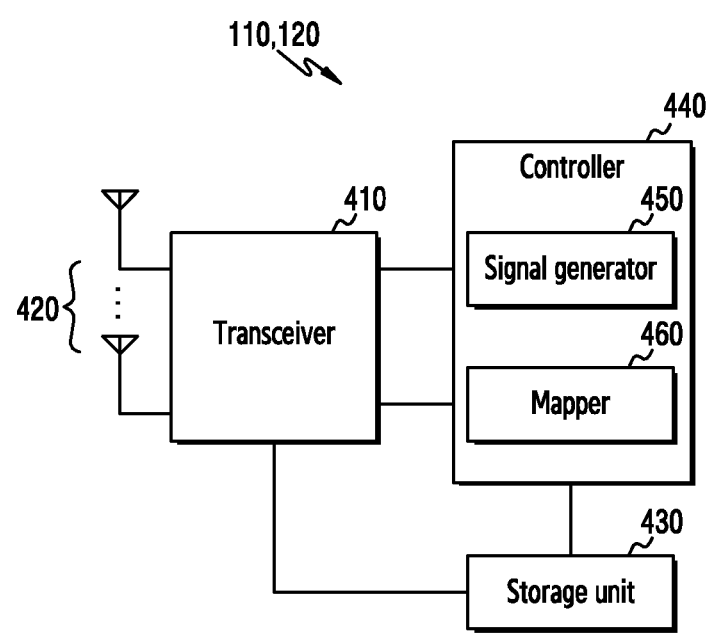
FIG. 4 illustrates a structure of a Base Station (BS) according to various exemplary embodiments of the present invention.

FIG. 4 illustrates a structure of a BS according to various exemplary embodiments of the present invention. For example, the BS may be the BS 110 or 120 of FIG. 1.

Referring to FIG. 3, the BS 110 or 120 may include a transceiver 410, an antenna 420, a storage unit 430, and a controller 440.

The transceiver 410 may include a Radio Frequency Transmitter (RF TX) which up-converts a transmitted signal into an RF signal and then performs power amplification thereon. The transceiver 410 may include a Radio Frequency Receiver (RF RX) which amplifies a received RF signal with a low noise and thereafter down-converts it to a baseband signal. In addition, the transceiver 410 may have a modulation/demodulation function for modulating a transmitted signal and demodulating a received signal. In this case, the modulation/demodulation may be achieved in an orthogonal (e.g., OFDM) or non-orthogonal (e.g., FBMC) manner.

The antenna 420 may include one or more antennas. In addition, the antenna 420 may be configured according to a Multi Input Multi Output (MIMO) scheme.

The storage unit 430 may be a group of one or more memories. The storage unit 430 may store data and/or instructions received from different constitutional elements (e.g., the transceiver 410, the controller 440, etc.) or generated by the different constitutional elements.

The controller 440 may receive an instruction of the different constitutional elements (e.g., the transceiver 410, the controller 440), interpret the received instruction, and perform calculation or data processing according to the interpreted instruction.

The controller 440 may include a signal generator 450 and a mapper 460. Further, the controller 440 may include at least one processor or microprocessor, or may play the part of the processor.

The signal generator 450 may generate a DL signal, a reference signal, or the like. Herein, the DL signal may be used for carrier phase synchronization for demodulating another channel signal in the terminal 100. In addition, the DL signal may have a different phase offset for each BS so that the terminal 100 is allowed to acquire information of the BS 110 or 120. In addition, the DL signal may have a high output so as to be received by terminals in a coverage region. The reference signal may include cell power. The DL signal and the reference signal may also be transmitted to a terminal for receiving a different service.

The mapper 460 may map allocation frequency information of the terminal 110 to the DL signal. In addition, the mapper 460 may map the number of transmission repetitions corresponding to the allocation frequency. In addition, the mapper 460 may map power control information to the DL signal. Herein, the power control information may include a transmission power value of the BS 110 or 120. The power control information may be used by the terminal 110 to calculate a path loss between the BS 110 and the BS 120.

Figure 5:
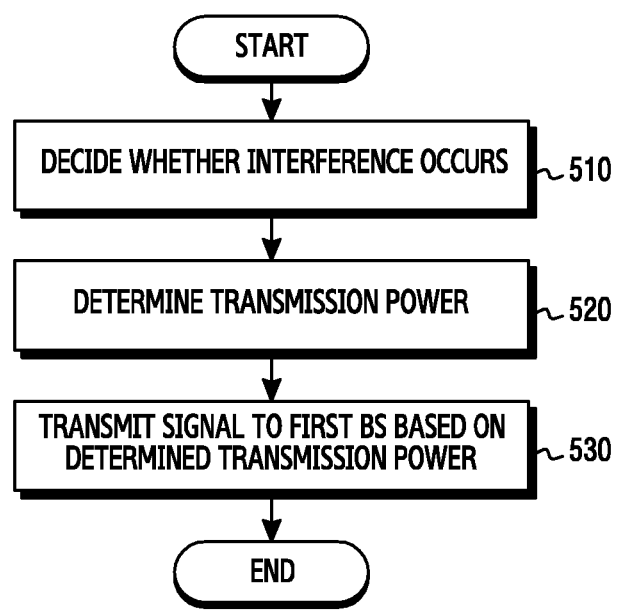
FIG. 5 is a flowchart illustrating an operation of a terminal according to various exemplary embodiments of the present invention.

FIG. 5 is a flowchart illustrating an operation of a terminal according to various exemplary embodiments of the present invention. The operational flow may be performed by the terminal 100 of FIG. 1.

Referring to FIG. 5, in step 510, the terminal 100 may decide whether interference to the BS 120 occurs due to a signal to be transmitted to the BS 110. An operation of the terminal 100 in step 510 may be performed by the interference estimation unit 350 of the terminal 100 of FIG. 3.

In step 520, the terminal 100 may determine transmission power in response to a decision result. For example, the terminal 100 may adjust a predefined power value in response to a decision result indicating that the interference occurs, and may determine the adjusted power value as the transmission power. Unlike this, the terminal 100 may determine the power value as the transmission power in response to a decision result indicating that the interference does not occur. The operation in step 520 may be performed by the power determination unit 360 of the terminal 100 of FIG. 3.

In step 530, the terminal 100 may transmit a signal to a first BS based on the determined transmission power. Herein, the first BS may be the BS 110. That is, the first BS may be a BS for providing a service to the terminal 100. If the predefined power value is downwardly adjusted in step 520, the terminal 100 may transmit the signal to the first BS by the number of repetitions corresponding to the downwardly adjusted power value in step 530. The operation in step 530 may be performed by one or more of the transceiver 310 and controller 340 of the terminal of FIG. 3.

Figure 6:
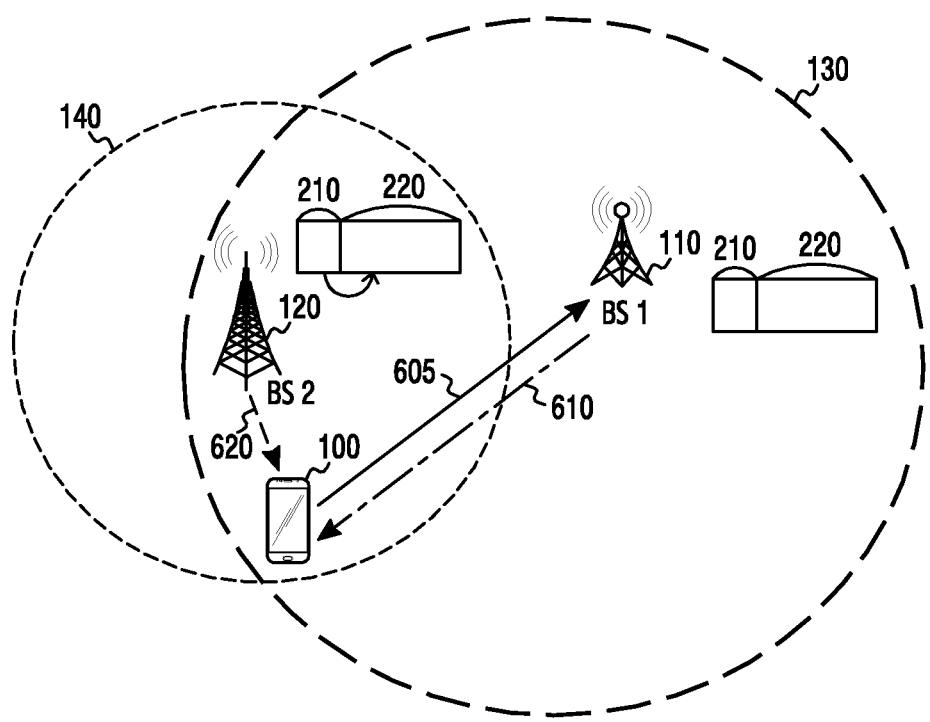
FIG. 6 illustrates the concept of an operation for controlling transmission power according to a first exemplary embodiment of the present invention.

FIG. 6 illustrates the concept of an operation for controlling transmission power according to a first exemplary embodiment of the present invention.

Referring to FIG. 6, the terminal 100 may be located in the coverage region of the BS 110 and the BS 120. The BS 110 may use the frequency band 210 as a reception frequency band, and the BS 120 may use the frequency band 220 adjacent to the frequency band 210 of the BS 120 as a reception frequency band. The terminal 110 may receive a service provided from the BS 110.

If the terminal 100 transmits a signal 605 to the BS 110, the signal 605 may cause interference to the BS 120. To solve this problem, the terminal 100, the BS 110, and the BS 120 may perform the following operation.

The BS 110 may transmit a DL signal 610 including power control information to the terminal 100. In addition, the BS 120 may transmit a DL signal 620 including power control information to the terminal 100. The terminal 100 may receive the DL signals 610 and 620. In addition, the terminal 100 may acquire the power control information by decoding the received DL signals 610 and 620. The power control information may include a transmission power value of a DL signal (i.e., the DL signals 610 and 620) of each BS (i.e., the BS 110 and the BS 120). Therefore, the terminal 100 may acquire the transmission power value through the power control information. In addition, the terminal 100 may measure a reception power value of the DL signals 610 and 620. The terminal 100 may calculate a path loss between the BS 110 and the terminal 100 (hereinafter, a first path loss) and a path loss between the BS 120 and the terminal 100 (hereinafter, a second path loss) based on the transmission power value and the reception power value.

Thereafter, the terminal 100 may determine threshold transmission power based on the second path loss. Herein, the threshold transmission power may be maximum transmission power which does not cause interference to the BS 120. The terminal 100 may determine the threshold transmission power for each frequency based on the second path loss. This is because the threshold transmission power may vary depending on a frequency used by the terminal 100. For example, the terminal 100 may assign relatively low threshold transmission power to a frequency close to the frequency band 200 among the frequency bands 210.

The terminal 100 may determine transmission power based on the determined threshold transmission power and the first path loss. In addition, the terminal 100 may transmit the signal 605 to the BS 110 based on the determined transmission power.

However, in a case where the transmission power is determined to be low (that is, in case of low threshold transmission power or in case of an environment in which interference to the BS 120 occurs frequently), the transmitted signal 605 may not easily reach the BS 110. Therefore, to solve this problem, the terminal 100 may determine the number of transmission repetitions of the signal 605 of the terminal 100. The number of transmission repetitions may correspond to the determined transmission power. Specifically, the lower the determined transmission power, and higher the determined number of transmission repetitions. Unlike this, the terminal 100 may separately determine a frequency at which transmission is repeated by a random number. The frequency may be the most interference-resistant frequency among frequencies allocated to the terminal 100.

Figure 7:
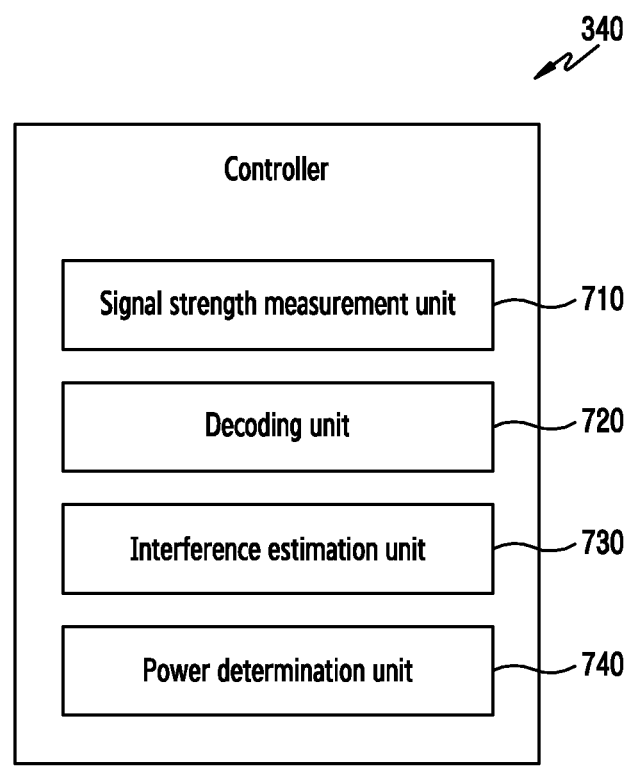
FIG. 7 illustrates a structure of a controller of a terminal for controlling transmission power according to a first exemplary embodiment of the present invention.

FIG. 7 illustrates a structure of a controller of a terminal for controlling transmission power according to a first exemplary embodiment of the present invention.

Referring to FIG. 7, the controller 340 may include a signal strength measurement unit 710, a decoding unit 720, an interference estimation unit 730, and a power determination unit 740.

The signal strength measurement unit 710 may measure reception power of a signal received by the terminal 100. For example, if the terminal 100 receives the DL signal 610 or 620, the signal strength measurement unit 710 may measure reception power of the received DL signal 610 or 620. The received reception power may be used to calculate a path loss between the terminal and the BS.

The decoding unit 720 may decode a signal received by the terminal 100. According to the first exemplary embodiment, the decoding unit 720 may decode the received DL signal 610 or 620. In addition, the terminal 100 may acquire power control information included in the DL signal 610 or 620 as a result of the decoding.

The interference estimation unit 730 may calculate a first path loss and a second path loss based on a transmission power value included in the power control information for the BS 110 and the BS 120 and the measured reception power value. The interference estimation unit 730 may determine threshold transmission power based on the second path loss. The interference estimation unit 730 may decide whether interference may occur by comparing the threshold transmission power and a predefined power value. If the predefined power value is greater than the threshold transmission power, the interference estimation unit 730 may decide that the interference may occur.

The power determination unit 740 may determine transmission power based on the first path loss and the threshold transmission power in response to a decision that the interference may occur. Specifically, the power determination unit 740 may calculate a lower limit of transmission power that can reach the BS 110 through the first path loss. In addition, the power determination unit 740 may calculate an upper limit of the transmission power through the threshold transmission power. Thereafter, the power determination unit 740 may determine the transmission power by considering the calculated upper and lower limits of the transmission power, a frequency that can be used by the terminal 100, other environments, or the like. In addition, the power determination unit 740 may optionally determine the number of transmission repetitions in response to the transmission power.

The terminal 100 may repetitively transmit a signal to the BS 110 based on the determined number of transmission repetitions according to the transmission power determined through the transceiver 310.

Figure 8:
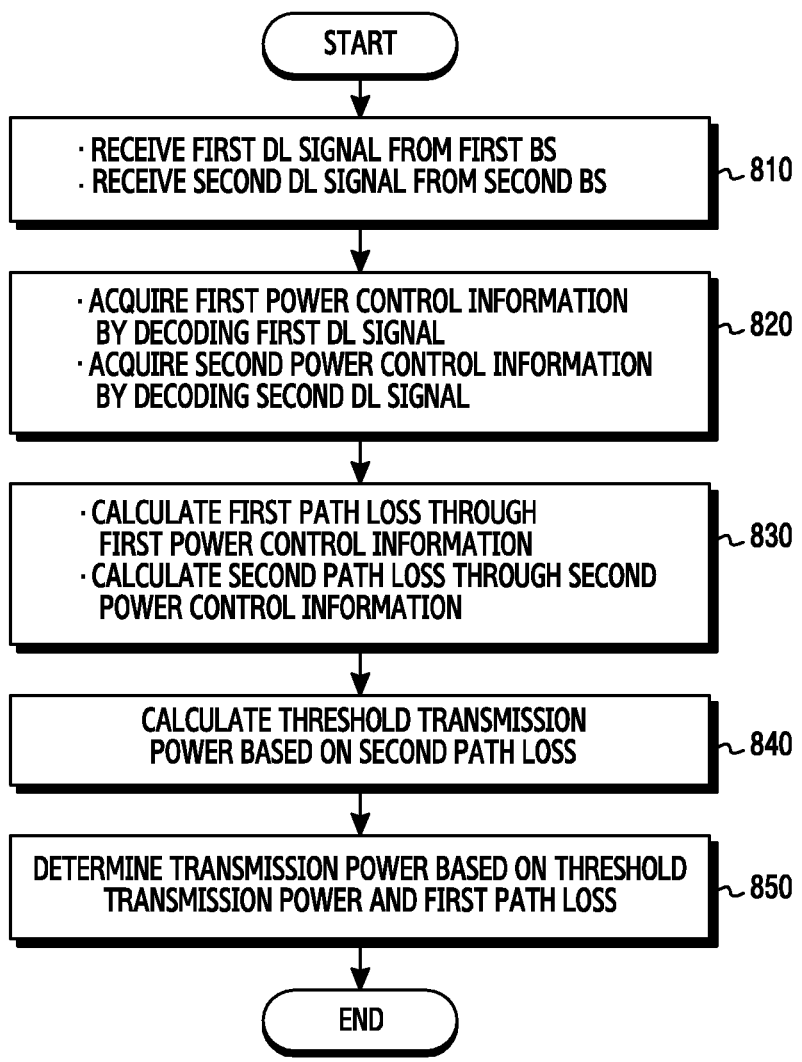
FIG. 8 is a flowchart illustrating an operation of a terminal for controlling transmission power according to a first exemplary embodiment of the present invention.

FIG. 8 is a flowchart illustrating an operation of a terminal for controlling transmission power according to a first exemplary embodiment of the present invention.

Referring to FIG. 8, in step 810, the terminal 100 may receive a first DL signal from a first BS by using the transceiver 310, and may receive a second DL signal from a second BS. Herein, the first BS may correspond to the BS 110, and the second BS may correspond to the BS 120. That is, the first BS may be a BS which provides a service to the terminal 100, and the second BS may be a BS which does not provide the service to the terminal 100 but is located in proximity to the terminal 100.

In step 820, the terminal 100 may acquire first power control information by decoding the first DL signal, and may acquire second power control information by decoding the second DL signal. The operation in step 820 may be performed by the decoding unit 720 of FIG. 7.

In step 830, the terminal 100 may calculate a first path loss and a second path loss through the acquired first power control information and second power control information. Herein, the first path loss may imply a path loss between the terminal 100 and the first BS, and the second path loss may imply a path loss between the terminal 100 and the second BS. Specifically, in step 830, the terminal 100 may acquire a transmission power value of the first BS, which is included in the first power control information. Further, in step 830, the terminal 100 may acquire a transmission power value of the second BS, which is included in the second power control information. In addition, the terminal 100 may acquire a reception power value of the first DL signal by measuring reception strength of the first DL signal. Further, the terminal 100 may acquire a reception power value of the second DL signal by measuring reception strength of the second DL signal. In addition, the terminal 100 may calculate the first path loss by comparing the transmission power value of the BS 110 and the reception power value of the first DL signal. Further, the terminal 100 may calculate the second path loss by comparing the transmission power value of the BS 120 and the reception power value of the second DL signal. The operation in step 830 may be performed by one or more of the decoding unit 720 and interference estimation unit 730 of FIG. 7.

Upon completion of the calculating of the first path loss and the second path loss, in step 840, the terminal 100 may calculate the threshold transmission power based on the second path loss. The operation in step 840 may be performed by the interference estimation unit 730 of FIG. 7.

In step 850, the terminal 100 may determine the transmission power based on the calculated threshold transmission power and the first path loss. Specifically, in step 850, the terminal 100 may calculate a lower limit of transmission power that can reach the first BS through the first path loss. In addition, in step 850, the terminal 100 may calculate an upper limit of the transmission power through the threshold transmission power. Thereafter, in step 850, the terminal 100 may determine the transmission power by considering the calculated upper and lower limits of the transmission power, a frequency that can be used by the terminal 100, other environments, or the like. In addition, in step 850, the terminal 100 may optionally determine the number of transmission repetitions in response to the transmission power. The operation in step 850 may be performed by one or more of the power determination unit 740 of FIG. 7 and the transceiver 310 of FIG. 3.

Figure 9:
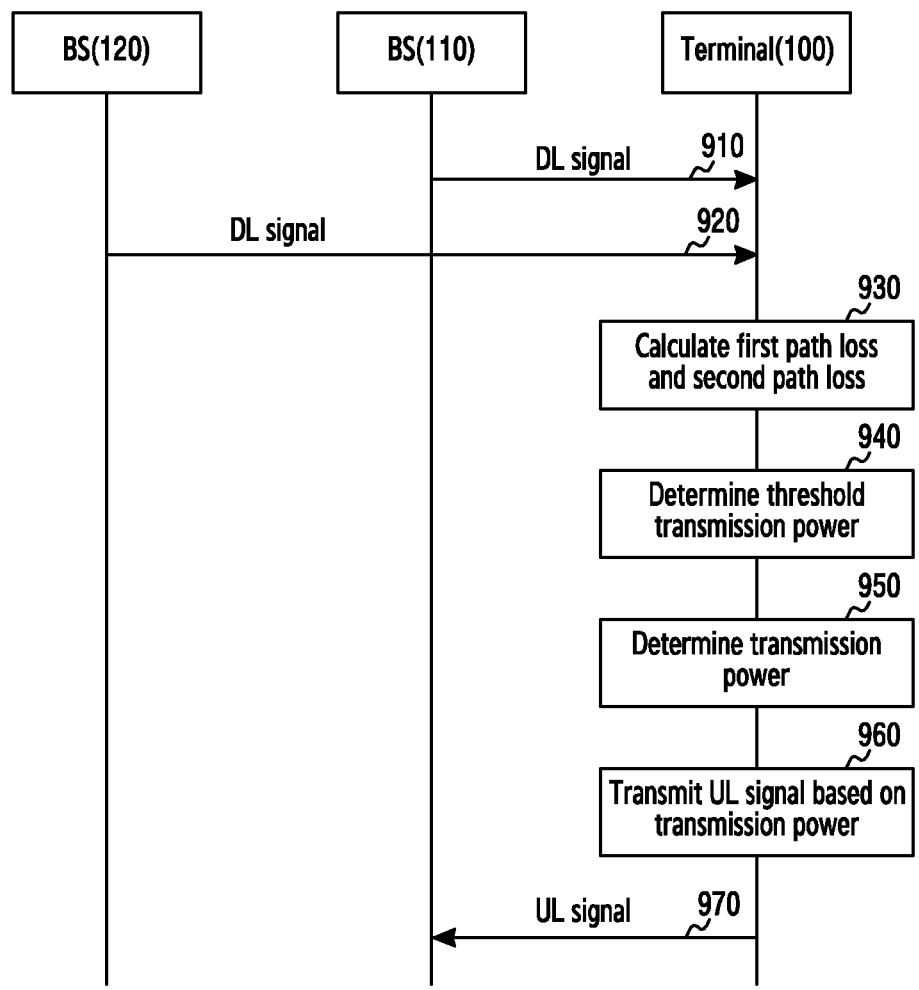
FIG. 9 illustrates a processing procedure between a terminal and a BS for controlling transmission power according to a first exemplary embodiment of the present invention.

FIG. 9 illustrates a processing procedure between a terminal and a BS for controlling transmission power according to a first exemplary embodiment of the present invention.

Referring to FIG. 9, the BS 110 may transmit a DL signal 910 to the terminal 100, and the BS 120 may transmit a DL signal 920 to the terminal 100. Accordingly, the terminal 100 may receive the DL signals 910 and 920. In step 930, the terminal 100 may calculate a first path loss and a second path loss through the received DL signals 910 and 920. The path loss may be calculated through power control information included in the DL signal. Herein, the first path loss implies a path loss between the BS 110 and the terminal 100, and the second path loss may imply a path loss between the BS 120 and the terminal 100. In step 940, the terminal 100 may determine threshold transmission power based on the second path loss. Thereafter, in step 950, the terminal 100 may determine transmission power based on the threshold transmission power and the first path loss. Upon completion of the determining of the transmission power, in step 960, the terminal 100 may transmit an UpLink (UL) signal 970 based on the transmission power. In this case, the terminal 100 may transmit the UL signal 970 repetitively in response to the determined transmission power. Herein, if the terminal 100 performs random access, the UL signal 970 may include a preamble.

Figure 10:
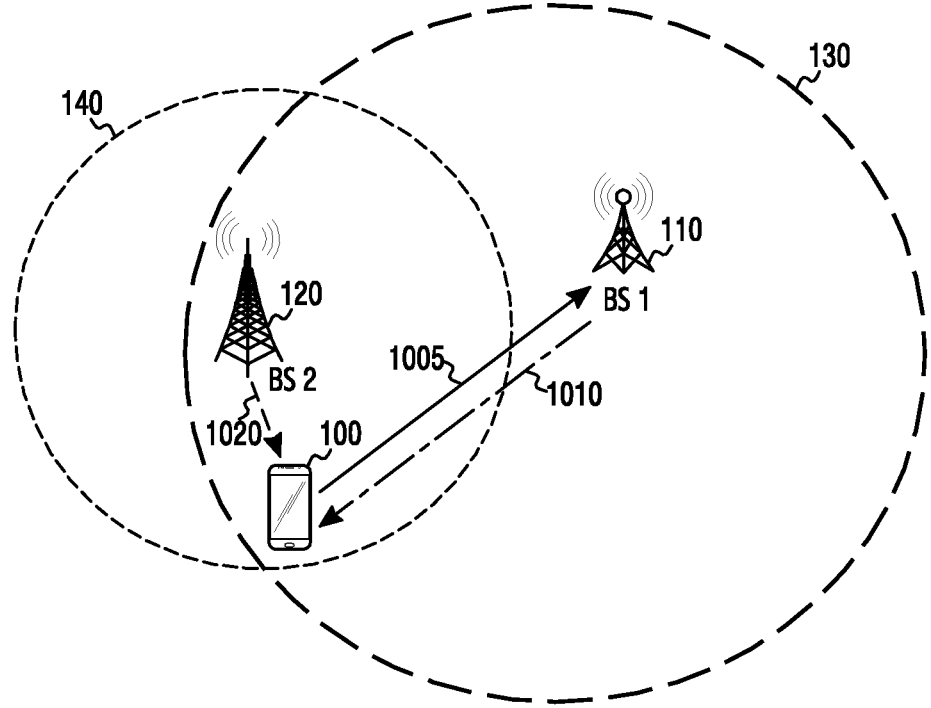
FIG. 10 illustrates the concept of an operation for controlling transmission power according to a second exemplary embodiment of the present invention.

FIG. 10 illustrates the concept of an operation for controlling transmission power according to a second exemplary embodiment of the present invention.

Referring to FIG. 10, the terminal 100 may be located in the coverage region of the BS 110 and the BS 120. The BS 110 may use the frequency band 210 as a reception frequency band, and the BS 120 may use the frequency band 220 adjacent to the frequency band 210 of the BS 120 as a reception frequency band. The terminal 110 may receive a service provided from the BS 110.

If the terminal 100 transmits a signal 1005 to the BS 110, the signal 1005 may cause interference to the BS 120. Herein, the signal 1005 may be a signal including a preamble to be transmitted by the terminal 100 to the BS 110 to perform random access. Alternatively, the signal 1005 may be a signal including data to be transmitted by the terminal 100 to the BS 110.

In order to avoid the interference to the BS 120, the terminal 100, the BS 110, and the BS 120 may perform the following operation.

The BS 110 may transmit a DL signal 1010 including power control information to the terminal 100. In addition, the BS 120 may transmit a DL signal 1020 to the terminal 100. Although it is expressed that the BS 120 may transmit the DL signal 1020 to the terminal 100, this may be only for convenience of explanation. The DL signal 1020 may be a signal received by the terminal 100 through the frequency band 220 adjacent to the frequency band 210. The DL signal 1020 may include or may not include power control information. The terminal 100 may receive the DL signal 1010. In addition, the terminal 100 may receive the DL signal 1020. Thereafter, the terminal 100 may decode the received DL signal 1010 to acquire the power control information. In addition, the terminal 100 may acquire a transmission power value of the BS 110 through the acquired power control information. Unlike this, the terminal 100 may predict the transmission power value through information (e.g., information regarding transmission power of the typical BS 110, a typical communication environment of the terminal 100, or the like) included in the storage unit 330, without decoding the DL signal 1010.

In addition, the terminal 100 may acquire a reception power value of the DL signal 1010 by measuring signal strength. The terminal 100 may calculate a first path loss between the terminal 100 and the BS 110 by comparing the transmission power value and the reception power value.

The terminal 100 may measure a reception power value of the DL signal 1020 by measuring reception strength of the DL signal 1020.

A terminal according to the second exemplary embodiment may not decode the DL signal 1020. The terminal 100 may determine threshold transmission power through the reception power value of the DL signal 1020. Specifically, the terminal 100 may predict transmission power of the BS 120 based on information (e.g., information regarding typical transmission power of the BS, a typical communication environment of the terminal 100, or the like) included in the storage unit 330 or the like of the terminal 100. The terminal 100 may calculate a second path loss based on the predicted transmission power and the reception power of the DL signal 1020. Thereafter, the terminal 100 may determine threshold transmission power based on the calculated second path loss.

The terminal 100 may determine the transmission power based on the threshold transmission power and the first path loss. By determining the transmission power, the terminal 100 may adjust a predefined power value, and may adjust the number of transmission repetitions.

The terminal 100 may transmit the signal 1005 to the BS 110 by using the determined transmission power.

Figure 11:
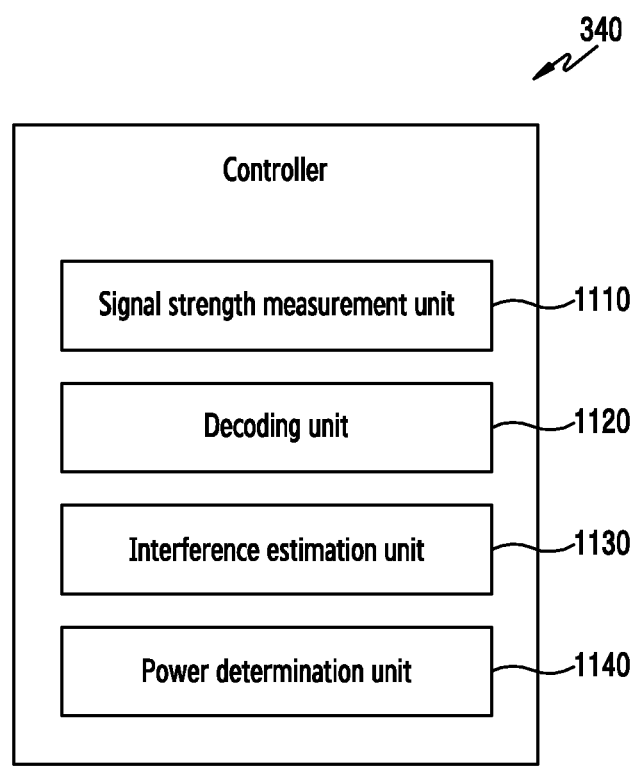
FIG. 11 illustrates a structure of a controller of a terminal for controlling transmission power according to a second exemplary embodiment of the present invention.

FIG. 11 illustrates a structure of a controller of a terminal for controlling transmission power according to a second exemplary embodiment of the present invention.

Referring to FIG. 11, the controller 340 may include a signal strength measurement unit 1110, a decoding unit 1120, an interference estimation unit 1130, and a power determination unit 1140.

The signal strength measurement unit 1110 may measure reception power of a signal received by the terminal 100. For example, if the terminal 100 receives the DL signal 1010 or 1020, the signal strength measurement unit 1110 may measure reception power of the received DL signal 1010 or 1020. The received reception power may be used to calculate a path loss between the terminal and the BS The decoding unit 1120 may decode a signal received by the terminal 100. According to the second exemplary embodiment, the decoding unit 1120 may decode the received DL signal 1010. In addition, the terminal 100 may acquire power control information included in the DL signal 1010 as a result of the decoding. The terminal 100 may acquire a transmission power value through the acquired power control information.

Unlike this, the terminal 100 may predict the transmission power value through information (e.g., information regarding transmission power of the typical BS 110, a typical communication environment of the terminal 100, or the like) included in the storage unit 330, without decoding the DL signal 1010. That is, in the second exemplary embodiment, the decoding unit 1120 of the controller 340 may be omitted.

The interference estimation unit 1130 may calculate a first path loss based on a transmission power value and the measured reception power value. In addition, the interference estimation unit 1130 may calculate a second path loss by using the reception power value of the BS 120. Unlike in the first exemplary embodiment, the interference estimation unit 1130 according to the second exemplary embodiment may not use the transmission power value of the BS 120. Specifically, the interference estimation unit 1130 may predict transmission power of the BS 120 by using information (e.g., path loss information in an environment in which the terminal 100 is frequently located, typical transmission power of the BS, or the like) included in the storage unit 330. The interference estimation unit 1130 may calculate the second path loss based on the predicted transmission power and reception power of the DL signal 1020.

The interference estimation unit 1130 may determine threshold transmission power based on the second path loss. In addition, the interference estimation unit 1130 may decide whether interference may occur by comparing the threshold transmission power with a predefined power value. If the predefined power value is greater than the threshold transmission power, the interference estimation unit 1130 may decide that the interference occurs.

The power determination unit 1140 may determine transmission power based on the first path loss and the threshold transmission power in response to a decision that the interference may occur. Specifically, the power determination unit 1140 may calculate a lower limit of transmission power that can reach the BS 110 through the first path loss. In addition, the power determination unit 1140 may calculate an upper limit of the transmission power through the threshold transmission power. Thereafter, the power determination unit 1140 may determine the transmission power by considering the calculated upper and lower limits of the transmission power, a frequency that can be used by the terminal 100, other environments, or the like. In addition, the power determination unit 1140 may optionally determine the number of transmission repetitions in response to the transmission power.

The terminal 100 may repetitively transmit a signal to the BS 110 based on the determined number of transmission repetitions according to the transmission power determined through the transceiver 310.

Figure 12:
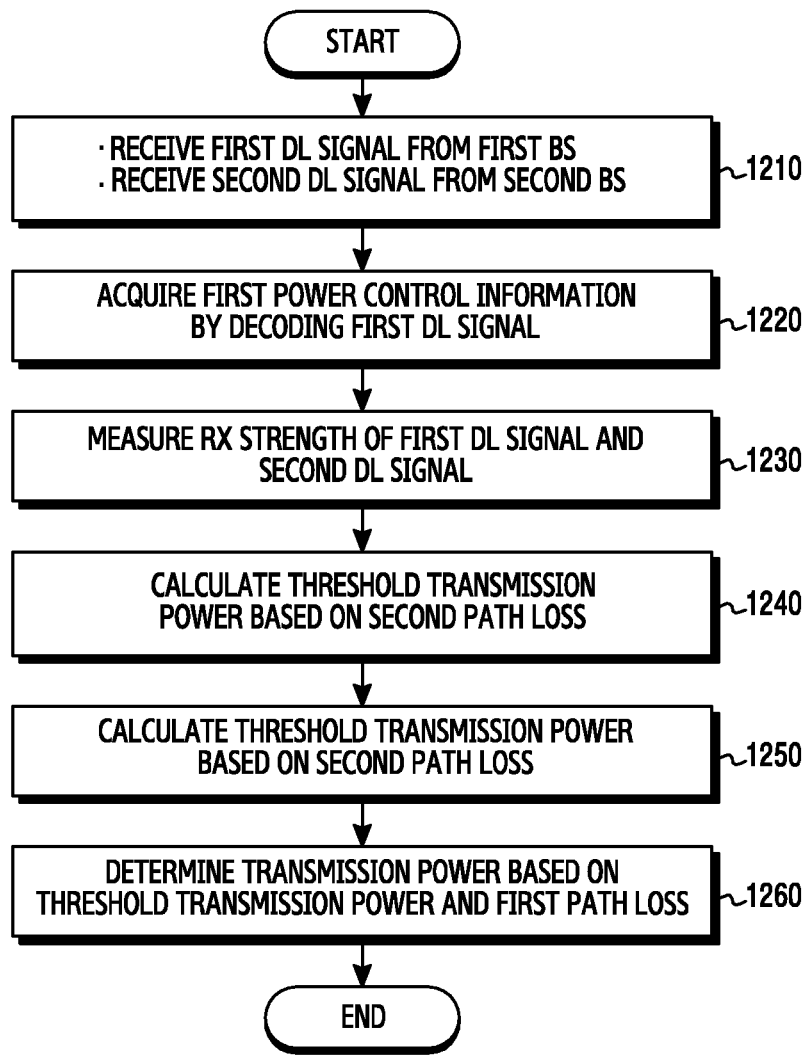
FIG. 12 is a flowchart illustrating an operation of a terminal for controlling transmission power according to a second exemplary embodiment of the present invention.

FIG. 12 is a flowchart illustrating an operation of a terminal for controlling transmission power according to a second exemplary embodiment of the present invention.

Referring to FIG. 12, in step 1210, the terminal 100 may receive a first DL signal from a first BS by using the transceiver 310, and may receive a second DL signal from a second BS. Herein, the first BS may correspond to the BS 110, and the second BS may correspond to the BS 120. That is, the first BS may be a BS which provides a service to the terminal 100, and the second BS may be a BS which does not provide the service to the terminal 100 but is located in proximity to the terminal 100. Power control information may be included in the first DL signal. The power control information may be included or may not be included in the second DL signal.

In step 1220, the terminal 100 may acquire first power control information by decoding the first DL signal. In addition, the terminal 100 and may acquire transmission power of the BS 110 through the first power control information. In the second exemplary embodiment, the terminal 100 may skip step 1220. Specifically, the terminal 100 may predict the transmission power value through information (e.g., information regarding transmission power of the typical BS 110, a typical communication environment of the terminal 100, or the like) included in the storage unit 330, without decoding the DL signal. The operation in step 1220 may be performed by one or more of the decoding unit 1120 and interference estimation unit 1130 of FIG. 11.

In step 1230, the terminal 100 may measure reception strength of a first DL signal and a second DL signal. That is, in step 1230, the terminal 100 may acquire reception power of the first DL signal and the second DL signal. The operation in operation 1230 may be performed by the signal strength measurement unit 1110 of FIG. 11.

Step 1220 and step 1230 may be performed in an opposite order or may be performed simultaneously in the terminal 100.

In step 1240, the terminal 100 may calculate a first path loss through acquired or predicted transmission power of the first BS and reception power of the first DL signal. In addition, in step 1240, the terminal 100 may calculate a second path loss through reception power of the second DL signal. Specifically, the terminal 100 may predict transmission power of the second BS by considering information regarding transmission power of the typical BS 110, a typical communication environment of the terminal 100, or the like included in the storage unit 330. The terminal 100 may calculate the second path loss based on the predicted transmission power and the reception power of the second DL signal. The operation in step 1240 may be performed by the interference estimation unit 1130 of FIG. 11.

Upon completion of the calculating of the path loss, in step 1250, the terminal 100 may determine (or calculate) threshold transmission power based on the second path loss. The operation in step 1250 may be performed by the interference estimation unit 1130 of FIG. 11.

In step 1260, the terminal 100 may determine the transmission power based on the threshold transmission power and the first path loss. Specifically, in step 1260, the terminal 100 may calculate a lower limit of transmission power that can reach the first BS through the first path loss. In addition, in step 1260, the terminal 100 may calculate an upper limit of the transmission power through the threshold transmission power. Thereafter, in step 1260, the terminal 100 may determine the transmission power by considering the calculated upper and lower limits of the transmission power, a frequency that can be used by the terminal 100, other environments, or the like.

In addition, in step 1260, the terminal 100 may optionally determine the number of transmission repetitions in response to the transmission power. The operation in step 1260 may be performed by the power determination unit 1140 of FIG. 11.

Figure 13:
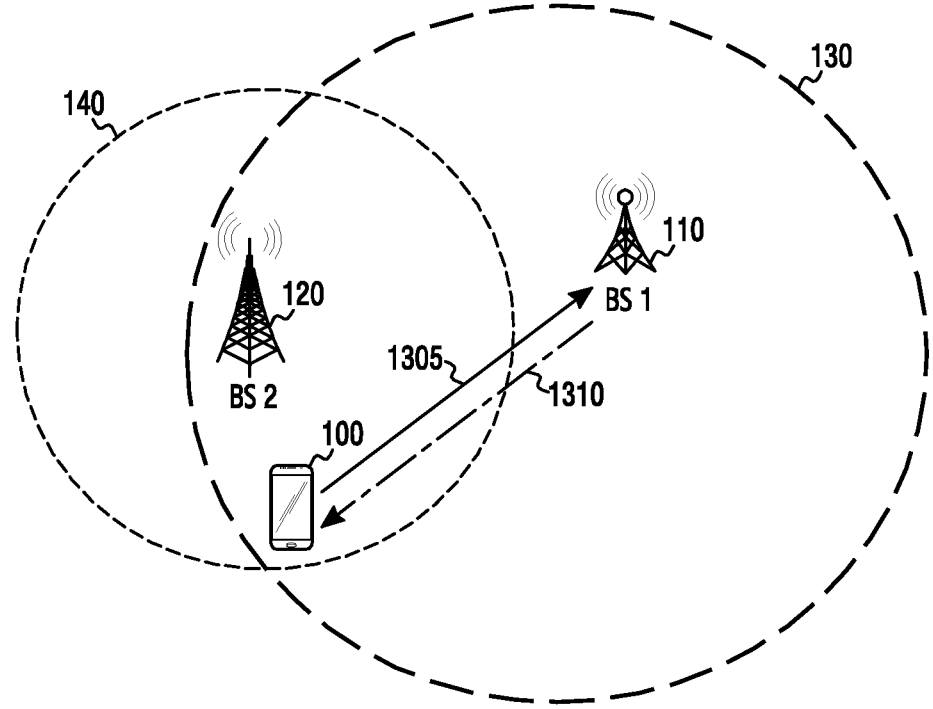
FIG. 13 illustrates the concept of an operation for controlling transmission power according to a third exemplary embodiment of the present invention.

FIG. 13 illustrates the concept of an operation for controlling transmission power according to a third exemplary embodiment of the present invention.

Referring to FIG. 13, the terminal 100 may be located in the coverage region of the BS 110 and the BS 120. The BS 110 may use the frequency band 210 as a reception frequency band, and the BS 120 may use the frequency band 220 adjacent to the frequency band 210 of the BS 120 as a reception frequency band. The terminal 110 may receive a service provided from the BS 110.

If the terminal 100 transmits a signal 1305 to the BS 110, the signal 1305 may cause interference to the BS 120. Herein, the signal 1305 may be a signal including a preamble to be transmitted by the terminal 100 to the BS 110 to perform random access. Alternatively, the signal 1305 may be a signal including data to be transmitted by the terminal 100 to the BS 110.

In order to avoid the interference to the BS 120, the terminal 100, the BS 110, and the BS 120 may perform the following operation.

The BS 110 may transmit a DL signal 1310 including power control information to the terminal 100. In response thereto, the terminal 100 may receive the DL signal 1310. The terminal 100 may decode the received DL signal 1310 to acquire the power control information. The terminal 100 may acquire a transmission power value of the BS 110 through the acquired power control information. Unlike this, the terminal 100 may predict the transmission power value through information (e.g., information regarding transmission power of the typical BS 110, a typical communication environment of the terminal 100, or the like) included in the storage unit 330, without decoding the DL signal 1310.

In addition, the terminal 100 may acquire a reception power value of the DL signal 1310 by measuring signal strength. The terminal 100 may calculate a first path loss between the terminal 100 and the BS 110 based on the transmission power value and the reception power value.

The terminal 100 may determine threshold transmission power by assuming a case where the terminal 100 is closest in distance to the BS 120. Specifically, the terminal 100 may predict a case where it is located closest to the BS 120 based on information (a typical distance between BSs, typical transmission power of the BS, etc.) included in the storage unit 330 of the terminal 100. The terminal 100 may determine the threshold transmission power based on the prediction.

The terminal 100 may determine the transmission power based on the threshold transmission power and the first path loss. By determining the transmission power, the terminal 100 may adjust a predefined power value, and may adjust the number of transmission repetitions.

The terminal 100 may transmit the signal 1305 to the BS 110 by using the determined transmission power.

Figure 14:
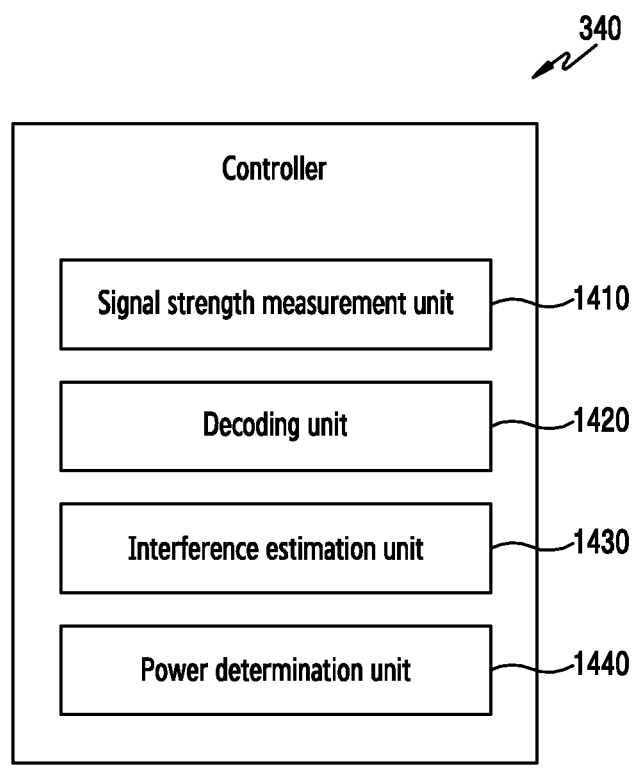
FIG. 14 illustrates a structure of a controller of a terminal for controlling transmission power according to a third exemplary embodiment of the present invention.

FIG. 14 illustrates a structure of a controller of a terminal for controlling transmission power according to a third exemplary embodiment of the present invention.

Referring to FIG. 14, the controller 340 may include a signal strength measurement unit 1410, a decoding unit 1420, an interference estimation unit 1430, and a power determination unit 1440.

The signal strength measurement unit 1410 may measure reception power of a signal received by the terminal 140. For example, if the terminal 140 receives the DL signal 1310, the signal strength measurement unit 1410 may measure reception power of the received DL signal 1310. The measured reception power may be used to calculate a path loss between the terminal 100 and the BS 110.

The decoding unit 1420 may decode a signal received by the terminal 100. According to the third exemplary embodiment, the decoding unit 1420 may decode the received DL signal 1310. In addition, the terminal 100 may acquire power control information included in the DL signal 1310 as a result of the decoding. The terminal 100 may acquire a transmission power value through the acquired power control information. Unlike this, the terminal 100 may predict the transmission power value through information (e.g., information regarding transmission power of the typical BS 110, a typical communication environment of the terminal 100, or the like) included in the storage unit 330, without decoding the DL signal 1310. That is, in the third exemplary embodiment, the decoding unit 1420 of the controller 340 may be omitted.

The interference estimation unit 1430 may calculate a first path loss by comparing the acquired or predicted transmission power value of the BS 110 and the measured reception power value.

The interference estimation unit 1430 may determine the threshold transmission power by assuming a case where the terminal 100 is closest in distance to the BS 120. Specifically, the interference estimation unit 1430 may predict a case where the terminal 100 is located closest to the BS 120 based on information (a typical distance between BSs, typical transmission power of the BS, etc.) included in the storage unit 330 of the terminal 100. The terminal 100 may determine the threshold transmission power based on the prediction.

The interference estimation unit 1430 may decide whether interference may occur by comparing the threshold transmission power with a predefined power value. If the predefined power value is greater than the threshold transmission power, the interference estimation unit 1430 may decide that the interference occurs.

The power determination unit 1440 may determine transmission power based on the first path loss and the threshold transmission power in response to a decision that the interference may occur. Specifically, the power determination unit 1440 may calculate a lower limit of transmission power that can reach the BS 110 through the first path loss. In addition, the power determination unit 1440 may calculate an upper limit of the transmission power through the threshold transmission power. The power determination unit 1440 may determine the transmission power by considering the calculated upper and lower limits of the transmission power, a frequency that can be used by the terminal 100, other environments, or the like. In addition, the power determination unit 1440 may optionally determine the number of transmission repetitions in response to the transmission power.

The terminal 100 may repetitively transmit a signal to the BS 110 based on the determined number of transmission repetitions according to the transmission power determined through the transceiver 310.

Figure 15:
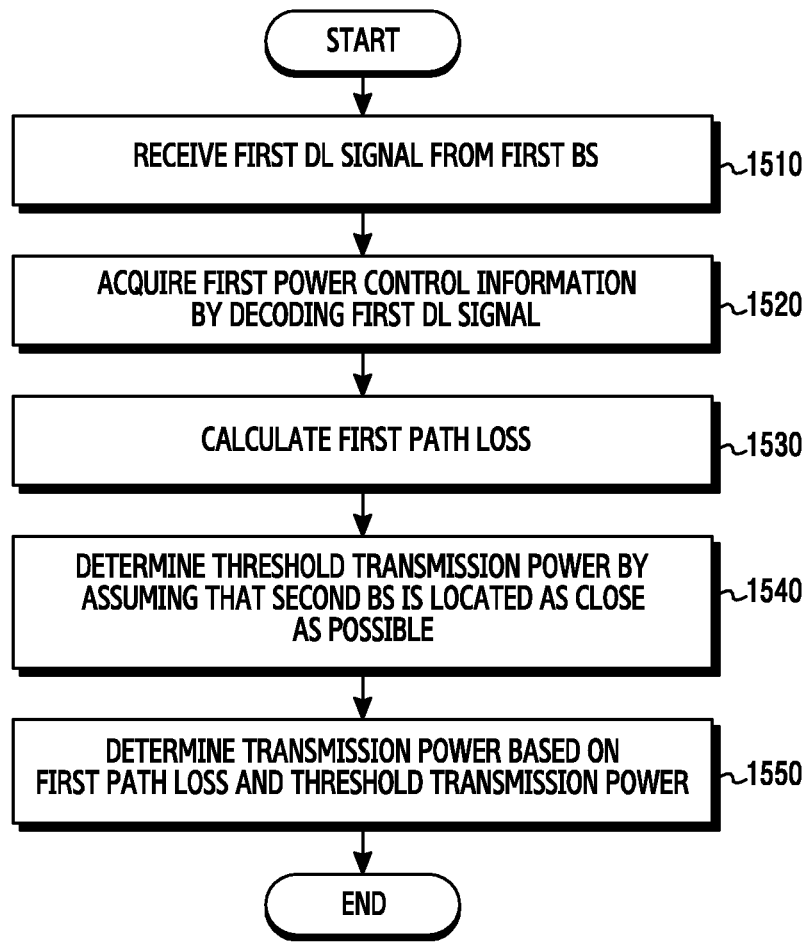
FIG. 15 is a flowchart illustrating an operation of a terminal for controlling transmission power according to a third exemplary embodiment of the present invention.

FIG. 15 is a flowchart illustrating an operation of a terminal for controlling transmission power according to a third exemplary embodiment of the present invention.

Referring to FIG. 15, in step 1510, the terminal 100 may receive a first DL signal from a first BS by using the transceiver 310. Herein, the first BS may correspond to the BS 110. That is, the first BS may be a BS for providing a service to the terminal 100. Power control information may be included in the first DL signal.

In step 1520, the terminal 100 may acquire first power control information by decoding the first DL signal. The terminal 100 and may acquire transmission power of the BS 110 through the first power control information. In the third exemplary embodiment, the terminal 100 may skip step 1520. Specifically, the terminal 100 may predict the transmission power value through information (e.g., information regarding transmission power of the typical BS 110, a typical communication environment of the terminal 100, or the like) included in the storage unit 330, without decoding the DL signal. The operation in step 1520 may be performed by one or more of the decoding unit 1420 and interference estimation unit 1430 of FIG. 14.

In step S1530, the terminal 100 may measure reception strength of a first DL signal. That is, in step 1530, the terminal 100 may acquire reception power of the first DL signal. In step 1530, the terminal 100 may calculate a first path loss based on the acquired or predicted transmission power and reception power value. The operation in step 1530 may be performed by one or more of the decoding unit 1420 and interference estimation unit 1430 of FIG. 14.

In step 1540, the terminal 100 may determine the threshold transmission power by assuming a case where the terminal 100 is closest in distance to the BS. Herein, the second BS may correspond to the BS 120. That is, the second BS may be a BS which does not provide the service to the terminal 100 but is located in proximity to the terminal 100.

Specifically, in step 1540, the terminal 100 may predict a case where the terminal 100 is located closest to the BS 120 based on information (a typical distance between BSs, typical transmission power of the BS, etc.) included in the storage unit 330 of the terminal 100. The terminal 100 may determine the threshold transmission power based on the prediction. The operation in step 1540 may be performed by the interference estimation unit 1430.

In step 1550, the terminal 100 may determine the transmission power based on the threshold transmission power and the first path loss. Specifically, in step 1550, the terminal 100 may calculate a lower limit of transmission power that can reach the first BS through the first path loss. In addition, in step 1550, the terminal 100 may calculate an upper limit of the transmission power through the threshold transmission power. Thereafter, in step 1550, the terminal 100 may determine the transmission power by considering the calculated upper and lower limits of the transmission power, a frequency that can be used by the terminal 100, other environments, or the like. In addition, in step 1550, the terminal 100 may optionally determine the number of transmission repetitions in response to the transmission power. The operation in step 1550 may be performed by one or more of the power determination unit 1440 of FIG. 14 and the transceiver 310 of FIG. 3.

Figure 16:
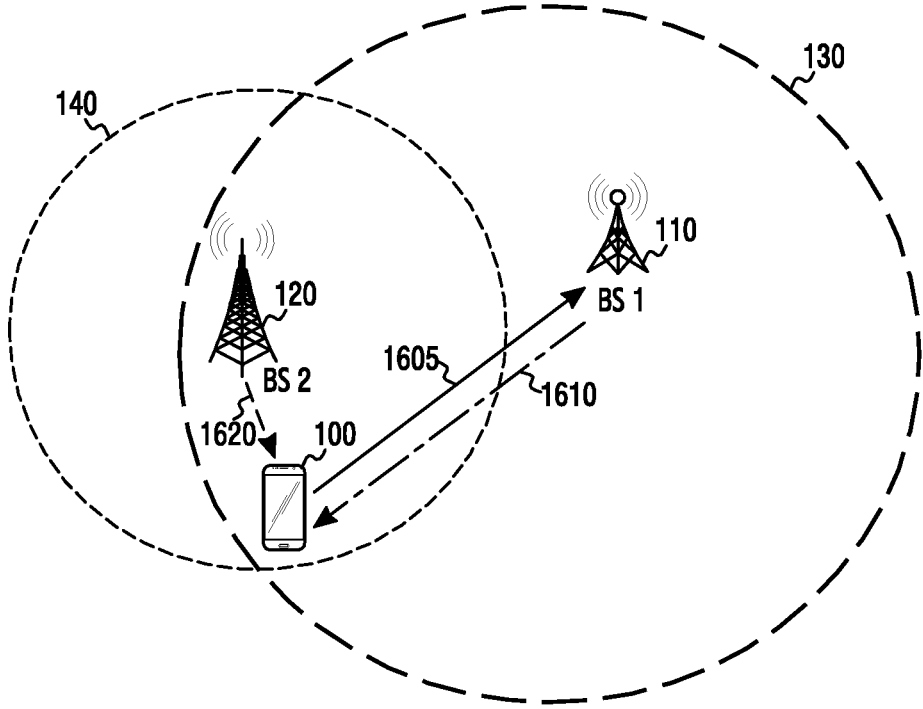
FIG. 16 illustrates the concept of an operation for controlling transmission power according to a fourth exemplary embodiment of the present invention.

FIG. 16 illustrates the concept of an operation for controlling transmission power according to a fourth exemplary embodiment of the present invention.

Referring to FIG. 16, the terminal 100 may be located in the coverage region of the BS 110 and the BS 120. The BS 110 may use the frequency band 210 as a reception frequency band, and the BS 120 may use the frequency band 220 adjacent to the frequency band 210 of the BS 120 as a reception frequency band. The terminal 110 may receive a service provided from the BS 110.

If the terminal 100 transmits a signal 1605 to the BS 110, the signal 1605 may cause interference to the BS 120. Herein, the signal 1605 may be a signal including a preamble to be transmitted by the terminal 100 to the BS 110 to perform random access. Alternatively, the signal 1605 may be a signal including data to be transmitted by the terminal 100 to the BS 110.

In order to avoid the interference to the BS 120, the terminal 100, the BS 110, and the BS 120 may perform the following operation.

The BS 110 may transmit a DL signal 1610 including power control information to the terminal 100. The BS 120 may transmit a reference signal 1620 to the terminal 100. The terminal 100 may receive the DL signal 1610 and the reference signal 1620. The terminal 100 may decode the received DL signal 1610 and reference signal 1620. The terminal 100 may acquire power control information by decoding the DL signal 1610. The terminal 100 may acquire a transmission power value of the BS 110 through the acquired power control information. In addition, the terminal 100 may acquire cell power included in the reference signal 1620 by decoding the reference signal 1620. The terminal 100 may acquire a transmission power value of the BS 120 through the cell power.

The terminal 100 may acquire a reception power value of the DL signal 1610 and reference signal 1620 by measuring signal strength. The terminal 100 may calculate a first path loss between the terminal 100 and the BS 110 based on the transmission power value of the BS 110 and the reception power value of the DL signal 1610. In addition, the terminal 100 may calculate a second path loss between the terminal 100 and the BS 120 based on the transmission power value of the BS 120 and the reception power value of the reference signal 1620.

The terminal 100 may determine threshold transmission power based on the second path loss.

The terminal 100 may determine transmission power based on the threshold transmission power and the first path loss. By determining the transmission power, the terminal 100 may adjust a predefined power value, and may adjust the number of transmission repetitions.

The terminal 100 may transmit the signal 1605 to the BS 110 by using the determined transmission power.

Figure 17:
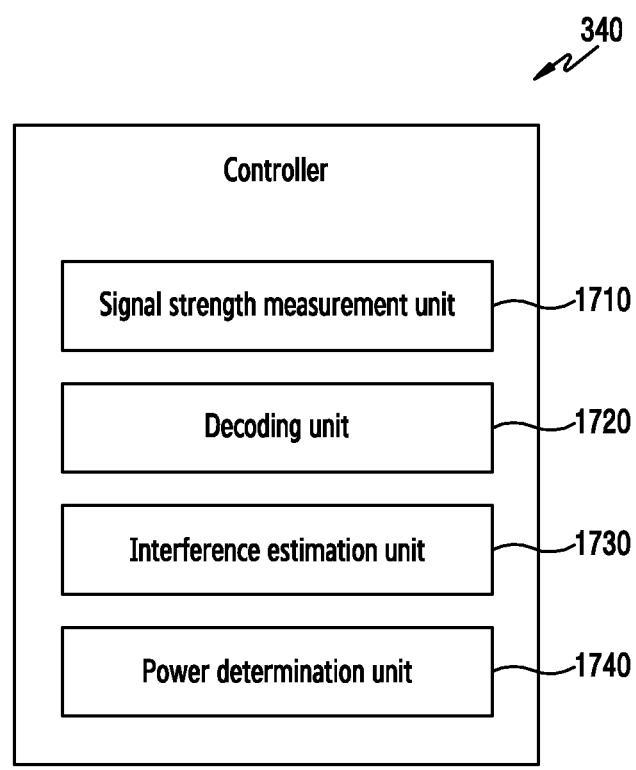
FIG. 17 illustrates a structure of a controller of a terminal for controlling transmission power according to a fourth exemplary embodiment of the present invention.

FIG. 17 illustrates a structure of a controller of a terminal for controlling transmission power according to a fourth exemplary embodiment of the present invention.

Referring to FIG. 17, the controller 340 may include a signal strength measurement unit 1710, a decoding unit 1720, an interference estimation unit 1730, and a power determination unit 1740.

The signal strength measurement unit 1710 may measure reception power of a signal received by the terminal 100. For example, if the terminal 100 receives the DL signal 1610 and the reference signal 1620, the signal strength measurement unit 1710 may measure reception power of the DL signal 1610 and the reference signal 1620. The reception power of the measured DL signal 1610 may be used to calculate a path loss between the terminal 100 and the BS 110. In addition, the measured reception power of the reference signal 1620 may be used to calculate a path loss between the terminal 100 and the BS 120.

The decoding unit 1720 may decode a signal received by the terminal 100. According to the fourth exemplary embodiment, the decoding unit 1720 may decode the received DL signal 1610 and reference signal 1620. In addition, the terminal 100 may acquire power control information included in the DL signal 1610 as a result of the decoding. Further, the terminal 100 may acquire cell power included in the reference signal 1620 as a result of the decoding. The terminal 100 may acquire a transmission power value of the BS 100 or the BS 120 through the acquired power control information or cell power.

The interference estimation unit 1730 may calculate a first path loss and a second path loss by comparing the acquired transmission power value of the BS 110 and the BS 120 and the measured reception power value.

The interference estimation unit 1730 may determine threshold transmission power based on the second path loss.

The interference estimation unit 1730 may decide whether interference may occur by comparing the threshold transmission power and a predefined power value. If the predefined power value is greater than the threshold transmission power, the interference estimation unit 1730 may decide that the interference may occur.

The power determination unit 1740 may determine transmission power based on the first path loss and the threshold transmission power in response to a decision that the interference may occur. Specifically, the power determination unit 1740 may calculate a lower limit of transmission power that can reach the BS 110 through the first path loss. In addition, the power determination unit 1740 may calculate an upper limit of the transmission power through the threshold transmission power. The power determination unit 1740 may determine the transmission power by considering the calculated upper and lower limits of the transmission power, a frequency that can be used by the terminal 100, other environments, or the like. In addition, the power determination unit 1740 may optionally determine the number of transmission repetitions in response to the transmission power.

The terminal 100 may repetitively transmit a signal to the BS 110 based on the determined number of transmission repetitions according to the transmission power determined through the transceiver 310.

Figure 18:
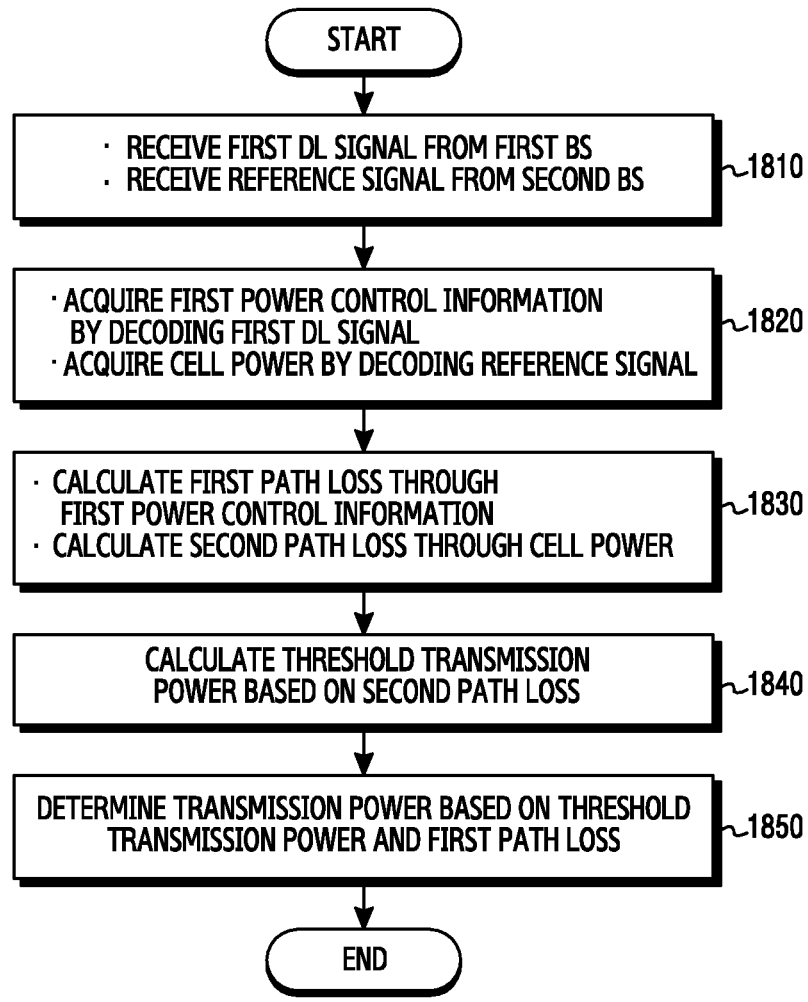
FIG. 18 is a flowchart illustrating an operation of a terminal for controlling transmission power according to a fourth exemplary embodiment of the present invention.

FIG. 18 is a flowchart illustrating an operation of a terminal for controlling transmission power according to a fourth exemplary embodiment of the present invention.

Referring to FIG. 18, in step 1810, the terminal 100 may receive a first DL signal from a first BS by using the transceiver 310, and may receive a reference signal from a second BS. Herein, the first BS may correspond to the BS 110, and the second BS may correspond to the BS 120. That is, the first BS may be a BS which provides a service to the terminal 100, and the second BS may be a BS which does not provide the service to the terminal 100 but is located in proximity to the terminal 100. Power control information may be included in the first DL signal. Cell power may be included in the reference signal.

In step 1820, the terminal 100 may acquire first power control information by decoding the first DL signal. Further, in step 1820, the terminal 100 may acquire cell power by decoding the reference signal. The operation in step 1820 may be performed by the decoding unit 1720 of FIG. 17.

In step 1830, the terminal 100 may calculate a first path loss and a second path loss through the acquired first power control information and cell power. Herein, the first path loss may imply a path loss between the terminal 100 and the first BS, and the second path loss may imply a path loss between the terminal 100 and the second BS. The terminal 100 may acquire a transmission power value of the BS 110 through the acquired first power control information. Further, the terminal 100 may acquire transmission power of the BS 120 through the cell power acquired in step 1820. The terminal 100 may acquire a reception power value of the first DL signal by measuring reception strength of the first DL signal. Further, the terminal 100 may acquire a reception power value of the reference signal by measuring reception strength of the reference signal. In addition, the terminal 100 may calculate the first path loss based on the transmission power value of the BS 110 and the reception power value of the first DL signal. Further, the terminal 100 may calculate the second path loss based on the transmission power value of the BS 120 and the reception power value of the reference signal. The operation in step 1830 may be performed by the interference estimation unit 1730 of FIG. 17.

Upon completion of the calculating of the first path loss and the second path loss, in step 1840, the terminal 100 may calculate the threshold transmission power based on the second path loss. The operation in step 1840 may be performed by the interference estimation unit 1730 of FIG. 17.

In step 1850, the terminal 100 may determine the transmission power based on the threshold transmission power and the first path loss. Specifically, in step 1850, the terminal 100 may calculate a lower limit of transmission power that can reach the first BS through the first path loss. In addition, in step 1850, the terminal 100 may calculate an upper limit of the transmission power through the threshold transmission power. In step 1850, the terminal 100 may determine the transmission power by considering the calculated upper and lower limits of the transmission power, a frequency that can be used by the terminal 100, other environments, or the like. In addition, in step 1850, the terminal 100 may optionally determine the number of transmission repetitions in response to the transmission power. The operation in step 1850 may be performed by the power determination unit 1740 of FIG. 17.

Figure 19:
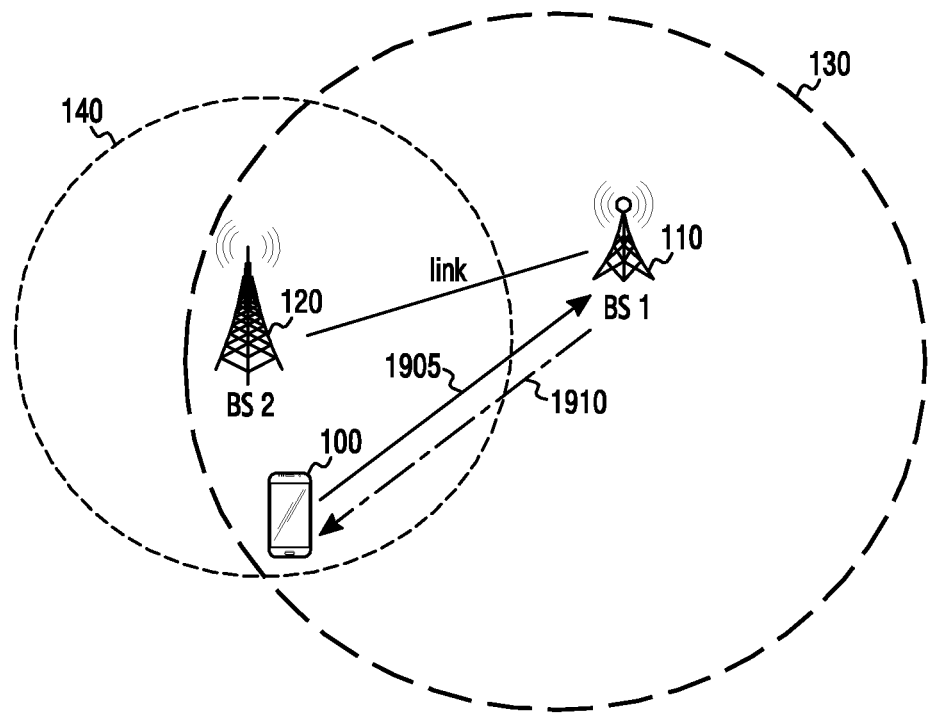
FIG. 19 illustrates the concept of an operation for controlling transmission power according to a fifth exemplary embodiment of the present invention.

FIG. 19 illustrates the concept of an operation for controlling transmission power according to a fifth exemplary embodiment of the present invention.

Referring to FIG. 19, the terminal 100 may be located in the coverage region of the BS 110 and the BS 120. The BS 110 may use the frequency band 210 as a reception frequency band, and the BS 120 may use the frequency band 220 adjacent to the frequency band 210 of the BS 120 as a reception frequency band. The terminal 110 may receive a service provided from the BS 110.

If the terminal 100 transmits a signal 1905 to the BS 110, the signal 1905 may cause interference to the BS 120. Herein, the signal 1905 may be a signal including a preamble to be transmitted by the terminal 100 to the BS 110 to perform random access. Alternatively, the signal 1905 may be a signal including data to be transmitted by the terminal 100 to the BS 110.

In order to avoid the interference to the BS 120, the terminal 100, the BS 110, and the BS 120 may perform the following operation.

The BS 110 may transmit a DL signal 1910 including power control information to the terminal 100. The terminal 100 may receive the DL signal 1910. The terminal 100 may decode the received DL signal 1910. The terminal 100 may acquire power control information through the decoding of the DL signal 1910. The terminal 100 may acquire a transmission power value of the BS 110 through the acquired power control information. Unlike this, the terminal 100 may predict the transmission power value through information (e.g., information regarding transmission power of the typical BS 110, a typical communication environment of the terminal 100, or the like) included in the storage unit 330, without decoding the DL signal 1910.

The terminal 100 may acquire a reception power value of the DL signal 1910 by measuring signal strength. The terminal 100 may calculate a first path loss between the terminal 100 and the BS 110 based on the transmission power value of the BS 110 and the reception power value of the DL signal 1910.

According to the fifth exemplary embodiment, the terminal 100 may include a location estimation unit such as a digital compass, a Global Navigation satellite System (GNSS), or the like. Herein, the digital compass is a digitized magnetic compass. The digital compass may know directions of north, south, east, and west similarly to a typical compass and may be used for the purpose of utilizing location information. The GNSS may report a location of the terminal 100 by using a satellite. The GNSS may include one or more of a Global Positioning System (GPS), a Global Navigation Satellite System (GLONASS), Beidou Navigation Satellite System or Galileo, and the European global satellite-based navigation system. The terminal 100 may acquire its location information through the location estimation unit. The terminal 100 may acquire location information of the BS 120 by detecting the BS 120 through the location estimation unit. Alternatively, the terminal 100 may acquire the location information of the BS 120 through the DL signal 1910. Herein, the DL signal 1910 may include the location information of the BS 120, which is delivered by the BS 120 to the BS 110 through a link between the BS 110 and the BS 120. The BS 120 may transmit the location information of the BS 120 to the BS 110 by using a backhaul (wired link) or the like. The terminal 100 may measure a distance between the BS 120 and the terminal 100 based on the location information of the BS 120 and the location information of the terminal 100. The terminal 100 may calculate a second path loss between the BS 120 and the terminal 110 through the measured distance.

The terminal 100 may determine threshold transmission power based on the second path loss.

The terminal 100 may determine the transmission power based on the threshold transmission power and the first path loss. By determining the transmission power, the terminal 100 may adjust a predefined power value, and may adjust the number of transmission repetitions.

The terminal 100 may transmit the signal 1905 to the BS 110 by using the determined transmission power.

Figure 20:
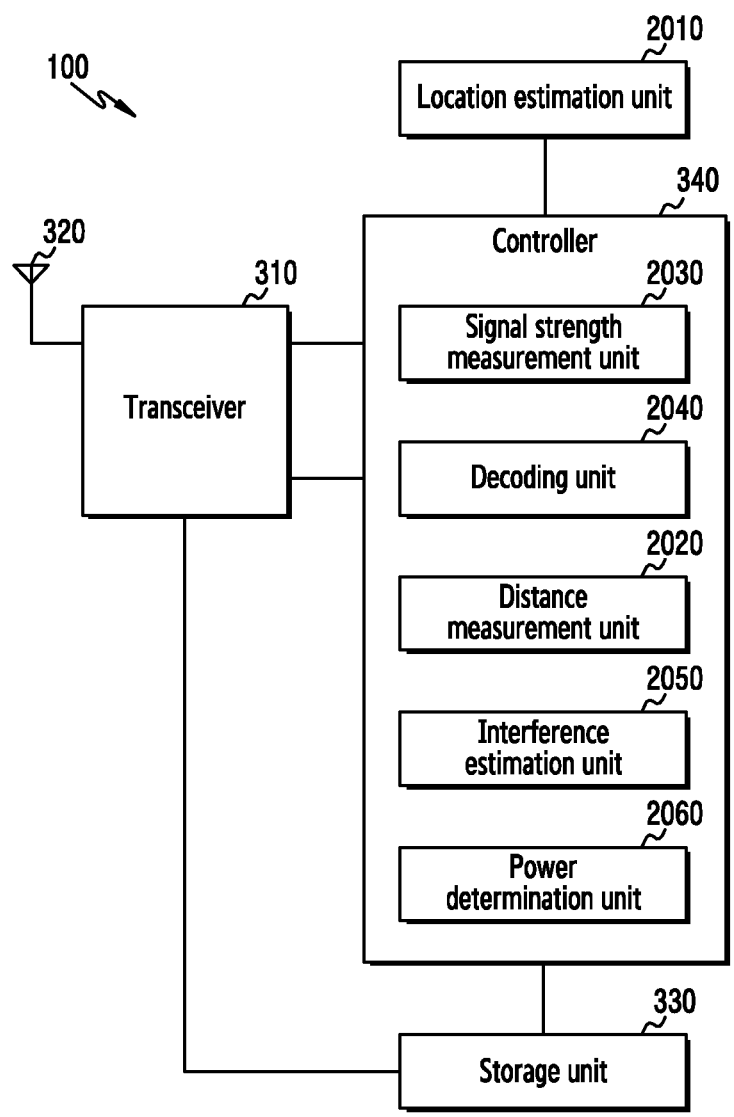
FIG. 20 illustrates a structure of a terminal for controlling transmission power according to a fifth exemplary embodiment of the present invention.

FIG. 20 illustrates a structure of a terminal for controlling transmission power according to a fifth exemplary embodiment of the present invention.

Referring to FIG. 20, the terminal 100 may include the transceiver 310, the antenna 320, the storage unit 330, the controller 340, and a location estimation unit 2010.

The location estimation unit 2010 may imply a group of one or more location estimation units. The location estimation unit 2010 may include a location estimation unit such as a digital compass, a Global Navigation Satellite System (GNSS), or the like. The location estimation unit 2010 may report location information of the terminal 100 to the controller 340. Further, the location estimation unit 2010 may report the location information of the BS 120 to the controller 340 by detecting the BS 120. The location information of the terminal 100 or the location information of the BS 120 may be used as a basis for measuring a distance between the terminal 100 and the BS 120 to be described below.

The controller 340 may include a signal strength measurement unit 2030, a decoding unit 2040, a distance measurement unit 2020, an interference estimation unit 2050, and a power determination unit 2060.

The signal strength measurement unit 2030 may measure reception power of a signal received by the terminal 100. For example, if the terminal 140 receives the DL signal 1910, the signal strength measurement unit 2030 may measure reception power of the DL signal 1910. The measured reception power of the DL signal 1910 may be used to calculate a path loss between the terminal 100 and the BS 110.

The decoding unit 2040 may decode a signal received by the terminal 100. According to the fifth exemplary embodiment, the decoding unit 2040 may decode the received DL signal 1910. In addition, the terminal 100 may acquire power control information included in the DL signal 1910 as a result of the decoding. Further, if the location information of the BS 120 is included in the DL signal 1910, the terminal 100 may acquire the location information of the BS 120 as a result of the decoding. The terminal 100 may acquire a transmission power value through the acquired power control information of the BS 110.

Unlike this, the terminal 100 may predict the transmission power value through information (e.g., information regarding transmission power of the typical BS 110, a typical communication environment of the terminal 100, or the like) included in the storage unit 330, without decoding the DL signal 1910. That is, in the fifth exemplary embodiment, the decoding unit 2040 of the controller 340 may be omitted. In this case, the terminal 100 of the fifth exemplary embodiment may acquire the location information of the BS 120 through the location estimation unit 2010.

The distance measurement unit 2020 may measure the distance between the terminal 100 and the BS 120 based on the location information of the terminal 100 and the location information of the BS 120. The distance between the terminal 100 and the BS 120 may be used to calculate a second path loss between the terminal 100 and the BS 120.

The interference estimation unit 2050 may calculate a first path loss by comparing the acquired transmission power value of the BS 110 and the measured reception power value.

The interference estimation unit 2050 may calculate the second path loss between the terminal 100 and the BS 120 through the measured distance between the terminal 100 and the BS 120. Specifically, the interference estimation unit 2050 may calculate the second path loss between the terminal 100 and the BS 120 through information (e.g., information regarding transmission power of the typical BS 110, a typical communication environment of the terminal 100, or the like) included in the storage unit 330.

The interference estimation unit 2050 may determine threshold transmission power based on the second path loss.

The interference estimation unit 2050 may decide whether interference may occur by comparing threshold transmission power and a predefined power value. If the predefined power value is greater than the threshold transmission power, the interference estimation unit 2050 may decide that the interference may occur.

The power determination unit 2060 may determine transmission power based on the first path loss and the threshold transmission power in response to a decision that the interference may occur. Specifically, the power determination unit 2060 may calculate a lower limit of transmission power that can reach the BS 110 through the first path loss. In addition, the power determination unit 2060 may calculate an upper limit of the transmission power through the threshold transmission power. The power determination unit 2060 may determine the transmission power by considering the calculated upper and lower limits of the transmission power, a frequency that can be used by the terminal 100, other environments, or the like. In addition, the power determination unit 2060 may optionally determine the number of transmission repetitions in response to the transmission power.

The terminal 100 may repetitively transmit a signal to the BS 110 based on the determined number of transmission repetitions according to the transmission power determined through the transceiver 310.

Figure 21:
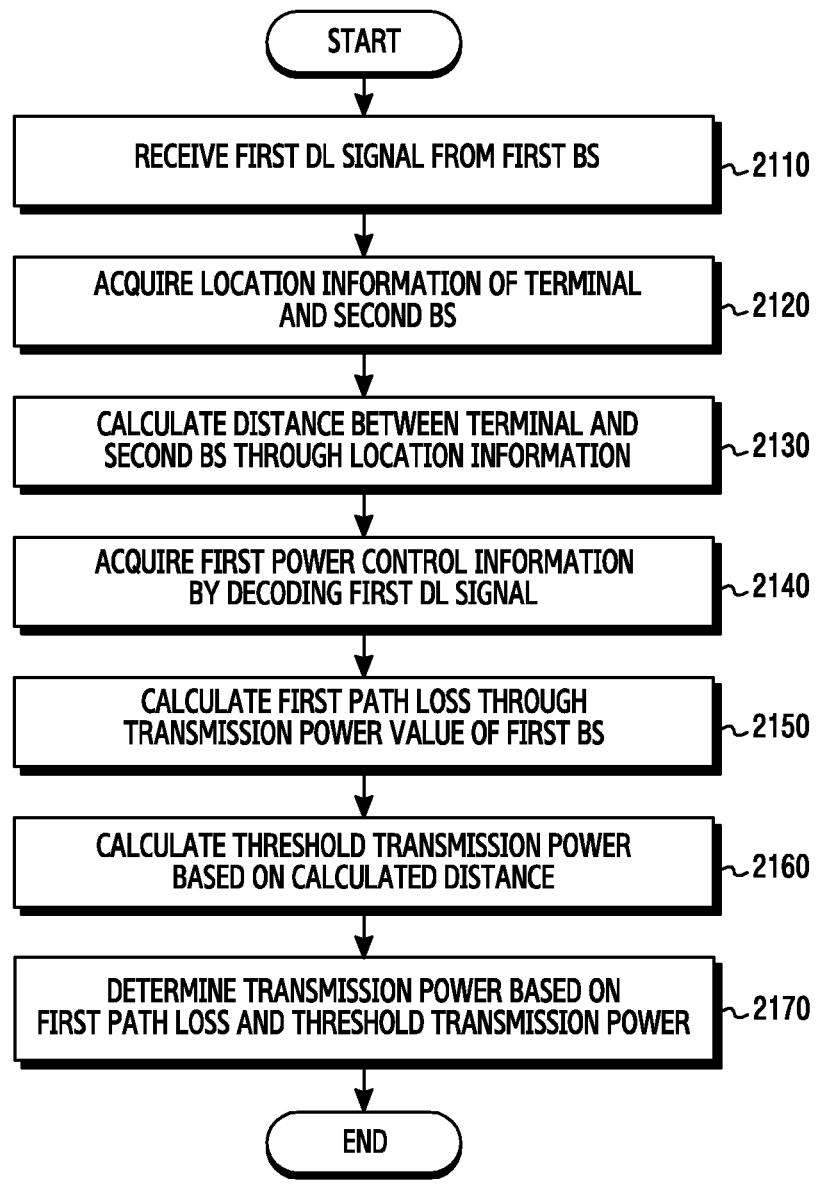
FIG. 21 is a flowchart illustrating an operation of a terminal for controlling transmission power according to a fifth exemplary embodiment of the present invention.

FIG. 21 is a flowchart illustrating an operation of a terminal for controlling transmission power according to a fifth exemplary embodiment of the present invention.

Referring to FIG. 21, in step 2110, the terminal 100 may receive a first DL signal from a first BS by using the transceiver 310. Herein, the first BS may correspond to the BS 110. That is, the first BS may be a BS for providing a service to the terminal 100. Power control information may be included in the first DL signal. Further, location information of the second BS may be included in the first DL signal. Herein, the second BS may correspond to the BS 120. That is, the BS 120 may be a BS which does not provide a service to the terminal 100, but is located in proximity to the terminal 100. If the location information of the second BS is included in the power control information, the location information of the second BS may be information acquired by the first BS through a communication link of the first BS and the second BS. Herein, transmission of the location information of the second BS through the communication link may be achieved through a backhaul (wired link) or the like.

In step 2120, the terminal 100 may acquire the location information of the terminal and second BS through the location estimation unit 2010. If the terminal 100 receives the first DL signal including the location information of the second BS in step 2110, the terminal 100 may not perform an operation of performing the location information of the second BS in step 2120.

The terminal 100 may perform the operation by changing the order of step 2110 and step 2120. Alternatively, the terminal 100 may simultaneously perform step 2110 and step 2120.

Thereafter, in step 2130, the terminal 100 may measure a distance between the terminal and the second BS by using the location information of the terminal and second BS. The operation in step 2130 may be performed by the distance measurement unit 2020 of FIG. 20.

Thereafter, in step 2140, the terminal 100 may acquire first power control information by decoding the first DL signal. In addition, the terminal 100 and may acquire transmission power of the first BS through the first power control information. Unlike this, the terminal 100 may predict the transmission power value through information (e.g., information regarding transmission power of the typical BS 110, a typical communication environment of the terminal 100, or the like) included in the storage unit 330, without decoding the DL signal. That is, in the fifth exemplary embodiment, the terminal 100 may skip step 2140. The operation in step 2140 may be performed by one or more of the decoding unit 2040 and interference estimation unit 2050 of FIG. 20.

In step 2150, the terminal 100 may calculate a first path loss through the acquired transmission power value of the first BS. Herein, the first path loss may imply a path loss between the terminal 100 and the first BS.

In step 2150, the terminal 100 may acquire a reception power value of the first DL signal by measuring reception strength of the first DL signal. In addition, the terminal 100 may calculate the first path loss based on the transmission power value of the BS 110 and the reception power value of the first DL signal. The operation in step 2150 may be performed by the interference estimation unit 2050 of FIG. 20.

In step 2160, the terminal 100 may calculate threshold transmission power based on the distance between the terminal and the second BS. Specifically, the terminal 100 may calculate a second path loss between the terminal 100 and the BS 120 through information (e.g., information regarding transmission power of the typical BS 110, a typical communication environment of the terminal 100, or the like) included in the storage unit 330. The terminal 100 may calculate the threshold transmission power based on the second path loss. The operation in step 2160 may be performed by the interference estimation unit 2050 of FIG. 20.

In step 2170, the terminal 100 may determine the transmission power based on the calculated threshold transmission power and the first path loss. Specifically, in step 2170, the terminal 100 may calculate a lower limit of transmission power that can reach the first BS through the first path loss. In addition, in step 2170, the terminal 100 may calculate an upper limit of the transmission power through the threshold transmission power. Thereafter, in step 2170, the terminal 100 may determine the transmission power by considering the calculated upper and lower limits of the transmission power, a frequency that can be used by the terminal 100, other environments, or the like. In addition, in step 2170, the terminal 100 may optionally determine the number of transmission repetitions in response to the transmission power. The operation in step 2170 may be performed by the power determination unit 2060 of FIG. 20.

A terminal in a wireless communication system according to the aforementioned various exemplary embodiments may include a controller for deciding whether interference to a second base station occurs due to a signal to be transmitted to a first base station and for determining transmission power in response to the decision, and a transceiver for transmitting a signal to the first base station based on the determined transmission power.

The controller may adjust a predefined power value in response to a decision that the interference occurs, and may determine the adjusted power value as the transmission power. The controller may determine the power value as transmission power of the terminal in response to a decision that the interference does not occur.

In addition, the controller may downwardly adjust the predefined power value in response to the decision that the interference occurs and may determine the downwardly adjusted power value as the transmission power. The transceiver may transmit the signal to the first base station by the number of repetitions corresponding to the downwardly adjusted power value.

In addition, the controller may acquire a second path loss between the second base station and the terminal, calculate threshold power based on the second path loss, and decide whether interference occurs based on the threshold transmission power. The terminal may further include a receiver for receiving from the second base station a second signal including transmission power of the second base station. The controller may calculate reception power of the second signal and acquire the second path loss based on the transmission power of the second base station and the reception power of the second signal. In addition, the receiver may receive from the first base station a first signal including transmission power of the first base station. The controller may calculate reception power of the first signal, acquire a first path loss based on the transmission power of the first base station and the reception power of the first signal, and determine the transmission power based on the first path loss and the threshold transmission power in response to a decision that the interference occurs. The controller may determine predefined power as the transmission power in response to a decision that the interference does not occur.

In addition, the terminal may further include a receiver for receiving a second signal from the second base station. The controller may calculate reception power of the second signal, and may acquire the second path loss based on the reception power of the second signal. In addition, the receiver may receive from the first base station a first signal including transmission power of the first base station. The controller may calculate reception power of the first signal, acquire the first path loss based on the transmission power of the first base station and the reception power of the first signal, and determine the transmission power based on the first path loss and the threshold transmission power in response to a decision that the interference occurs. The controller may determine predefined power as the transmission power in response to a decision that the interference does not occur.

In addition, the terminal may further include a receiver for receiving from the second base station a reference signal including cell power. The controller may calculate reception power of the second signal, acquire transmission power of the second base station based on the cell power, and acquire the second path loss based on the transmission power of the first base station and the reception power of the second signal. In addition, the receiver may receive from the first base station a first signal including transmission power of the first base station. The controller may calculate reception power of the first signal, acquire the first path loss based on the transmission power of the first base station and the reception power of the first signal, and determine the transmission power based on the first path loss and the threshold transmission power in response to a decision that the interference occurs. The controller may determine predefined power as the transmission power in response to a decision that the interference does not occur.

In addition, the terminal may further include a location estimation unit for acquiring location information of the terminal and the second base station. The controller may calculate a distance between the terminal and the second base station based on the acquired location information, and may acquire the second path loss based on the distance between the terminal and the second base station. The terminal may further include a receiver for receiving from the first base station a first signal including transmission power of the first base station. The controller may calculate reception power of the first signal, acquire the first path loss based on the transmission power of the first base station and the reception power of the first signal, and determine the transmission power based on the first path loss and the threshold transmission power in response to a decision that the interference occurs. The controller may determine predefined power as the transmission power in response to a decision that the interference does not occur.

According to various exemplary embodiments of the present invention, a method of operating a terminal in a wireless communication system may include deciding whether interference to a second base station occurs due to a signal to be transmitted to a first base station, determining transmission power in response to the decision, and transmitting a signal to the first base station based on the determined transmission power.

The determining of the transmission power may include adjusting a predefined power value in response to a decision that the interference occurs, and determining the adjusted power value as the transmission power. The determining of the transmission power may further include determining the power value as transmission power of the terminal in response to a decision that the interference does not occur.

The determining of the transmission power may further include downwardly adjusting the predefined power value in response to the decision that the interference occurs, and determining the downwardly adjusted power value as the transmission power. The transmitting of the signal to the first base station may further include transmitting the signal to the first base station by the number of repetitions corresponding to the downwardly adjusted power value.

The determining whether the interference to the second base station occurs due to the signal to be transmitted by the terminal to the first base station may include acquiring a second path loss between the second base station and the terminal, calculating threshold power based on the second path loss, and determining whether interference occurs based on the threshold transmission power. The acquiring of the second path loss may include receiving from the second base station a second signal including transmission power of the second base station, calculating reception power of the second signal, and acquiring the second path loss based on the transmission power of the second base station and the reception power of the second signal. The determining of the transmission power in response to the decision may include receiving from the first base station a first signal including transmission power of the first base station, calculating reception power of the first signal, acquire a first path loss based on the transmission power of the first base station and the reception power of the first signal, and determining the transmission power based on the first path loss and the threshold transmission power in response to a decision that the interference occurs. The determining of the transmission power in response to the decision may further include determining predefined power as the transmission power in response to a decision that the interference does not occur.

In addition, the acquiring of the second path loss may further include receiving a second signal from the second base station, calculating reception power of the second signal, and acquiring the second path loss based on the reception power of the second signal. The determining of the transmission power in response to the decision may include receiving from the first base station a first signal including transmission power of the first base station, calculating reception power of the first signal, acquire the first path loss based on the transmission power of the first base station and the reception power of the first signal, and determining the transmission power based on the first path loss and the threshold transmission power in response to a decision that the interference occurs. The determining of the transmission power in response to the decision may further include determining predefined power as the transmission power in response to a decision that the interference does not occur.

In addition, the acquiring of the second path loss may include receiving from the second base station a reference signal including cell power, calculating reception power of the second signal, acquiring transmission power of the second base station based on the cell power, and acquiring the second path loss based on the transmission power of the first base station and the reception power of the second signal. The determining of the transmission power in response to the decision may include receiving from the first base station a first signal including transmission power of the first base station, calculating reception power of the first signal, acquire the first path loss based on the transmission power of the first base station and the reception power of the first signal, and determining the transmission power based on the first path loss and the threshold transmission power in response to a decision that the interference occurs. The determining of the transmission power in response to the decision may further include determining predefined power as the transmission power in response to a decision that the interference does not occur.

In addition, the acquiring of the second path loss may include acquiring location information of the terminal and the second base station, calculating a distance between the terminal and the second base station based on the acquired location information, and acquiring the second path loss based on the distance between the terminal and the second base station. The determining of the transmission power in response to the decision may include receiving from the first base station a first signal including transmission power of the first base station; calculating reception power of the first signal, acquire the first path loss based on the transmission power of the first base station and the reception power of the first signal, and determining the transmission power based on the first path loss and the threshold transmission power in response to a decision that the interference occurs. The determining of the transmission power in response to the decision may further include determining predefined power as the transmission power in response to a decision that the interference does not occur.

An apparatus and an operating method thereof according to various exemplary embodiments can control transmission power of a signal to be transmitted to a serving base station, so that interference to a neighboring base station does not occur.

Methods based on the embodiments disclosed in the claims and/or specification of the present invention can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present invention.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an exemplary embodiment of the present invention via an external port. In addition, an additional storage device on a communication network can have an access to the device for performing the exemplary embodiment of the present invention.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an exemplary embodiment of the present invention via an external port. In addition, an additional storage device on a communication network can have an access to the device for performing the exemplary embodiment of the present invention.

While the present invention has been shown and described with reference to certain preferred embodiments thereof, it will be understood by those skilled in the art that various changes in form and details may be made therein without departing from the spirit and scope of the present invention as defined by the appended claims. Therefore, the scope of the present invention is defined not by the detailed description thereof but by the appended claims, and all differences within equivalents of the scope will be construed as being included in the present invention.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of operating a terminal in a wireless communication system, the method comprising:
    determining a first transmission power of the terminal based on a path loss for a serving base station;
    determining a threshold transmission power of the terminal based on a path loss for a neighbor base station; and
    transmitting, to the serving base station, a signal repetitively by a number of times with a second transmission power lower than or equal to the threshold transmission power in response to determining that the first transmission power is greater than the threshold transmission power.

2. The method of claim 1, wherein the number of times corresponds to a difference value between the first transmission power and the second transmission power.

3. The method of claim 1, further comprising:
    determining that a signal to be transmitted with the first transmission power
    to the serving base station causes an interference to the neighbor base station if the first transmission power
    is greater than the threshold transmission power; and
    determining that a signal to be transmitted with the first transmission power to the serving base station does not cause the interference to the neighbor base station if the first transmission power is less than or equal to the threshold transmission power.

4. The method of claim 1, further comprising:
    receiving, from the neighbor base station, a second signal comprising information regarding a transmission power of the second signal;
    determining a reception power of the second signal; and
    determining the path loss for the neighbor base station based on the transmission power of the second signal and the reception power of the second signal.

5. The method of claim 1, further comprising:
    receiving, from the serving base station, a first signal comprising information regarding a transmission power of the first signal;
    determining a reception power of the first signal; and
    determining the path loss for the serving base station based on the transmission power of the first signal and the reception power of the first signal.

6. The method of claim 1, further comprising:
receiving, from the neighbor base station, a reference signal comprising information regarding a cell power of the neighbor base station;
determining a reception power of the reference signal; and
determining the path loss for the neighbor base station based on a transmission power of the reference signal and the reception power of the reference signal,
wherein the transmission power of the reference signal is determined based on the cell power.

7. The method of claim 1, further comprising:
determining a location of the neighbor base station and a location of the terminal;
determining a distance between the terminal and the neighbor base station based on the location of the terminal and the location of the neighbor base station; and
determining the path loss for the neighbor base station based on the distance.

8. The method of claim 1, wherein the second transmission power is lower than the first transmission power.

9. The method of claim 1,
wherein the threshold transmission power is a maximum transmission power of the terminal that does not cause an interference to the neighbor base station.

10. The method of claim 9, further comprising:
determining the second transmission power based on a path loss for the serving base station and the threshold transmission power.

11. A terminal of a wireless communication system, the terminal comprising:
at least one processor; and
at least one transceiver coupled to the at least one processor,
wherein the at least one processor is configured to:
determine a first transmission power of the terminal based on a path loss for a serving base station, and
determine a threshold transmission power of the terminal based on a path loss for a neighbor base station, and
wherein the at least one transceiver is further configured to transmit, to the serving base station, a signal repetitively by a number of times with a second transmission power
lower than or equal to the threshold transmission power in response to determining that the first transmission power is greater than the threshold transmission power.

12. The terminal of claim 11, wherein the number of times corresponds to a difference value between the first transmission power and the second transmission power.

13. The terminal of claim 11, wherein the at least one processor is configured to:
determine that a signal to be transmitted with the first transmission power
to the serving base station causes an interference to the neighbor base station if the first transmission power is greater than the threshold transmission power, and
determine that a signal to be transmitted with the first transmission power to the serving base station does not cause the interference to the neighbor base station if the first transmission power is less than or equal to the threshold transmission power.

14. The terminal of claim 11, wherein the at least one processor is configured to:
control the at least one transceiver to receive, from the neighbor base station, a second signal comprising information regarding a transmission power of the second signal,
determine a reception power of the second signal, and
determine the path loss for the neighbor base station based on the transmission power of the second signal and the transmission power of the second signal.

15. The terminal of claim 11, wherein the at least one processor is configured to:
control the at least one transceiver to receive, from the serving base station, a first signal comprising information regarding a transmission power of the first signal,
determine a reception power of the first signal, and
determine the path loss for the serving base station based on the transmission power of the first signal and the reception power of the first signal.

16. The terminal of claim 11, wherein the at least one processor is configured to:
control the at least one transceiver to receive, from the neighbor base station, a reference signal comprising information regarding a cell power of the neighbor base station;
determine a reception power of the reference signal, and
determine the path loss for the neighbor base station based on a transmission power of the reference signal and the reception power of the reference signal,
wherein the transmission power of the reference signal is determined based on the cell power.

17. The terminal of claim 11, wherein the at least one processor is configured for:
determine a location of the neighbor base station and a location of the terminal;
determine a distance between the terminal and the neighbor base station based on the location of the terminal and the location of the neighbor base station; and
determine the path loss for the neighbor base station based on the distance.

18. The terminal of claim 11, wherein the second transmission power is lower than the first transmission power.

19. The terminal of claim 11, wherein the
threshold transmission power is a maximum transmission power of the terminal that does not cause an interference to the neighbor base station.

20. The terminal of claim 11, wherein the at least one processor is further configured to:
determine the second transmission power based on the path loss for the serving base station and the threshold transmission power.

* * * * *